United States Patent [19]

Gruen et al.

[11] 3,875,339

[45] Apr. 1, 1975

[54] VARIABLE BANDWIDTH VOICE AND DATA TELEPHONE COMMUNICATION SYSTEM

[75] Inventors: Harold Gruen, Merion; Philip S. Divita, Richboro; Charles J. Werneth, Holland, all of Pa.

[73] Assignee: I. I. Communications, Inc., Lionville, Pa.

[22] Filed: Sept. 5, 1972

[21] Appl. No.: 286,077

[52] U.S. Cl. ....... 179/15 FD, 179/15 BY, 179/2 DP
[51] Int. Cl. ........................................... H04j 1/14
[58] Field of Search .......... 179/15 FD, 15 FE, 15 R, 179/15 BY, 15 BW, 2 DP, 3, 4

[56] References Cited

UNITED STATES PATENTS

| | | | |
|---|---|---|---|
| 1,984,099 | 12/1934 | Viard | 179/3 |
| 2,426,222 | 8/1947 | Katchatouroff | 179/4 |
| 3,261,922 | 7/1966 | Edson | 179/15 BY |
| 3,389,225 | 6/1968 | Myers | 179/15 BW |

*Primary Examiner*—Ralph D. Blakeslee
*Attorney, Agent, or Firm*—Caesar, Rivise, Bernstein & Cohen

[57] ABSTRACT

A switching network preferably for use with a private branch exchange telephone system which switching network facilitates the simultaneous transmission of a plurality of voice and/or data grade signals and accompanying control signals, plus the switching signals needed to establish any one of the various alternative modes of operation in which the system is capable of operating.

11 Claims, 18 Drawing Figures

VARIABLE BANDWIDTH VOICE AND DATA TELEPHONE COMMUNICATION SYSTEM

BACKGROUND OF THE INVENTION

In the earliest telephone communication systems speech was transmitted over wires at voice frequencies. It was soon realized that this was an inefficient way of utilizing the costly wire installations since the wires are capable of transmitting a much broader band of frequencies than that needed to convey the voice signals. Out of this realization there evolved a succession of carrier systems characterized in that a plurality of communications may be placed on a single transmission medium. Each such communication occupies a separate channel. Historically, each channel has comprised an effective customer bandwidth of approximately 3,000 Hertz, this being the frequency span available to the customer for his use in conveying the information to be transmitted. Although carrier systems have been greatly improved since their inception, they still retain the basic characteristics of a 3,000 Hertz effective customer bandwidth.

Various attempts have been made to introduce further economies into telephone communications in addition to those afforded by the carrier concept. Several of these proposals involve the reduction in effective customer bandwidth to something on the order of 2,000 Hertz, thereby enabling two channels of information to be conveyed on a bandwidth of approximately 4,000 Hertz. Numerous deficiencies surround such proposals, primarily among which is the fact that they are impractical and/or incomplete ideas of inventors who are either associated with the major corporate entity in the telecommunication field, or are persons who similarly believe they are in a position where they can exert sufficient influence on said corporate entity such that the latter will convert the existing system to accommodate their proposed operating standards. Thus, the aforementioned proposals are generally impractical in the sense that in order to be implemented it would first be necessary to modify the standards of basic telephone communication by expanding the effective customer bandwidth from 3 Kilohertz to 4 Kilohertz.

Besides being totally lacking in practicality, these prior art proposals are generally not capable of being implemented for what of some critical feature such as allowance for signaling capability or frequency separation between adjacent information channels. The vast majority of such systems designed to further efficiencize the transmission of telephony and telegraphy-type information cannot operate with existing facilities. They are made by persons who overlook the fact that the huge investment in existing plant equipment makes very unrealistic the adoption of their idea since that would necessarily mean the abandonment of a substantial portion of the existing facilities.

In summary, the prior art attempts at providing an increase in the number of voice communications capable of being accommodated within a single channel of a carrier system have been characterized by one or more of the following deficiencies:

a. an extremely high cost in implementation so as to make the system an economic impracticality;

b. the necessity to adopt new operating standards and specifications with respect to the system with which the proposed units are designed to operate. Usually the adoption of the proposed system of operation means conversion to a broader frequency band per channel, an impracticality because of the high capital investment with such changes entail; and c. an incomplete and/or inoperative system such as one lacking in the necessary signaling functions or wherein the operating characteristics of the system are beyond the current technology or else are designed in total ignorance of the problem of interchannel crosstalk.

SUMMARY OF THE INVENTION

The present invention is specifically designed to meet the needs of so-called "private line" service; i.e., lines belonging to customers whose usage rates are so high that it is economically advantageous for them to lease a line on a permanent basis from the telephone company. Although not as practical for the short haul, the present invention has particular applicability to long-haul service connections such as for transcontinental or transoceanic lines. Since the private lines comprise the same cable and radio service, the subject invention has equal applicability to all commercial applications.

The subject invention has various modes of operating capability, including the ability to transmit within one effective customer bandwidth of 3,000 Hertz:

1. a conventional voice frequency communication plus from one to three telegraph signals;
2. two-voice frequency communications of abbreviated but fully intelligible bandwidths, plus from one to three telegraph channels;
3. one-voice frequency communication of abbreviated bandwidth plus up to thirteen telegraph channels;
4. one-voice frequency communication plus a bandwidth of approximately 1,500 Hertz for the transmission of data grade signals;
5. all data in one or more channels.

In addition to the foregoing, the subject invention also provides means for transmitting control signals in company of the above-identified information signals, all within the specified effective customer bandwidth of 3,000 Hertz.

The practical advantages of an apparatus in the nature of the subject invention should be readily apparent; however, for a more complete understanding of the invention, its advantages and mode of operation, reference is made to the detailed explanation in the specification, claims and drawings.

IN THE DRAWINGS

Figure 4:
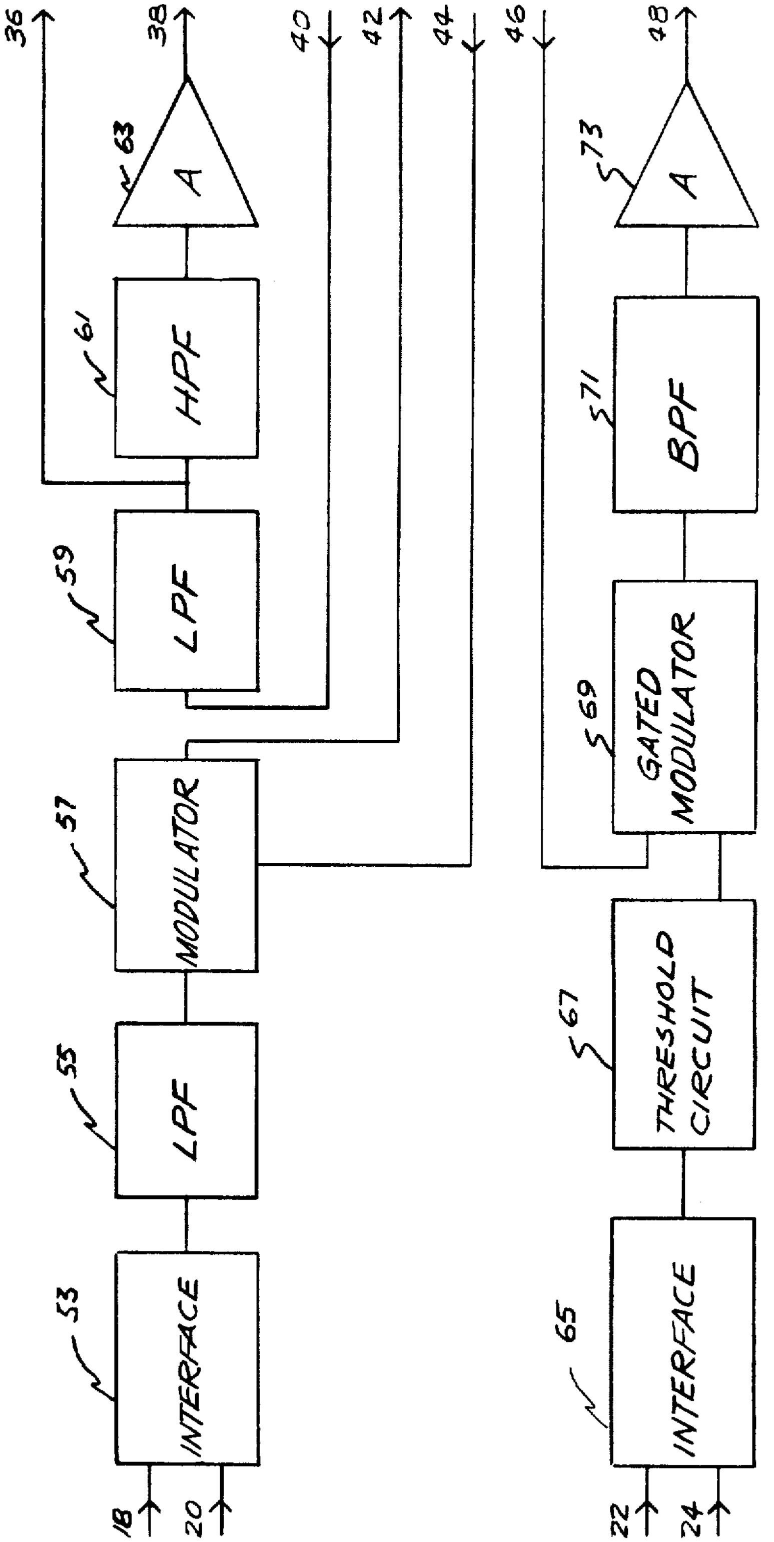
FIG. 4 is a block diagrammatic representation of the Transmit 2 portion of FIG. 2.
Figure 6:
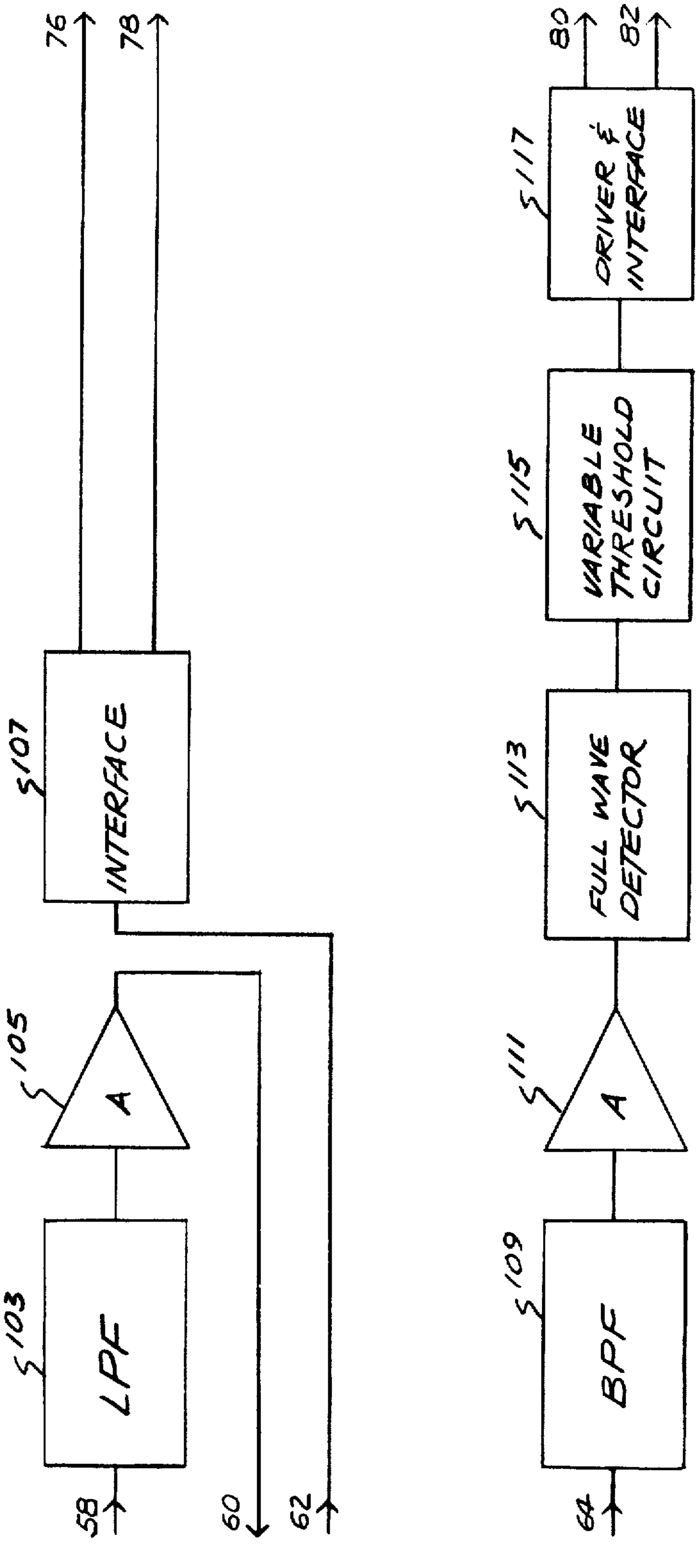
FIG. 6 is a diagrammatic representation of the Receive 1 portion of FIG. 2.
Figure 7:
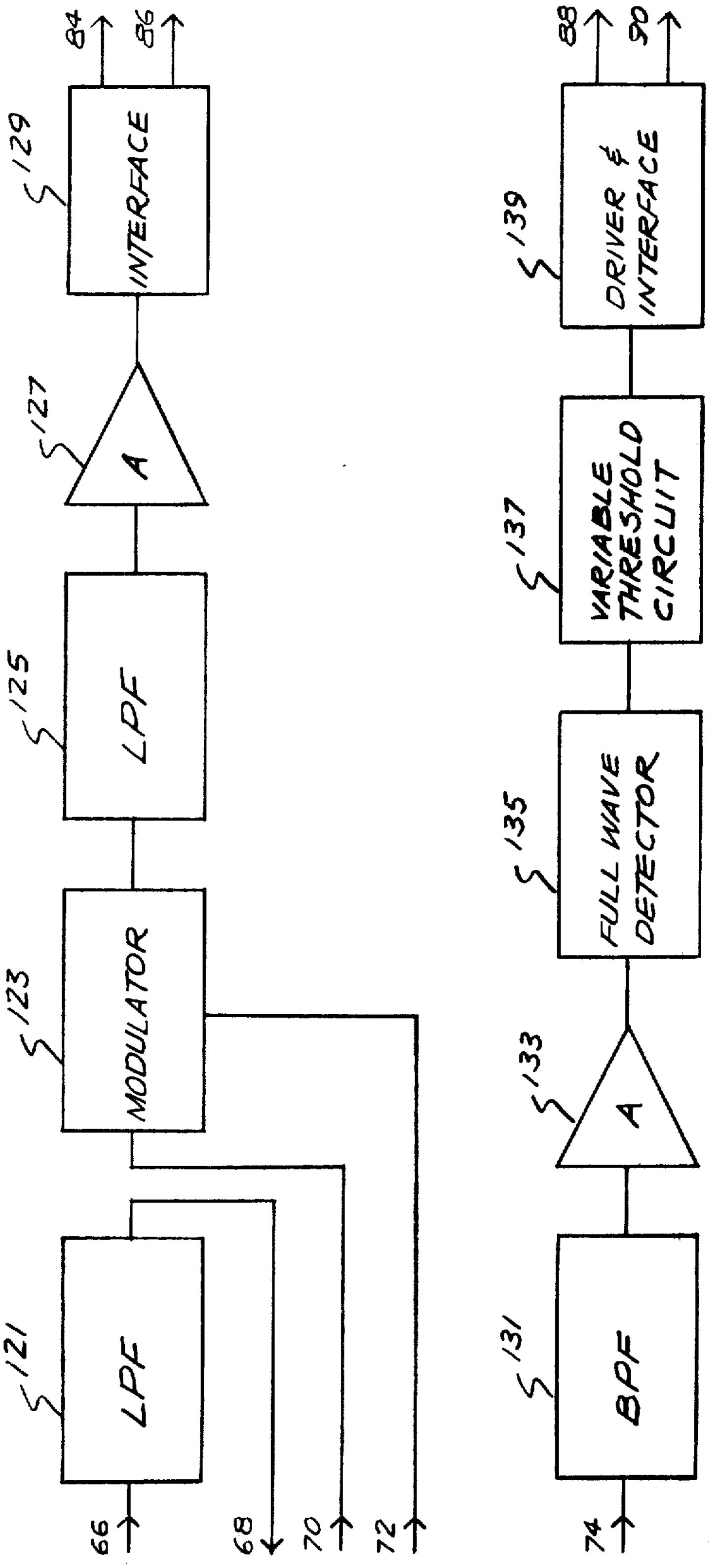
FIG. 7 is a diagrammatic representation of the Receive 2 portion of FIG. 2.
Figure 13:
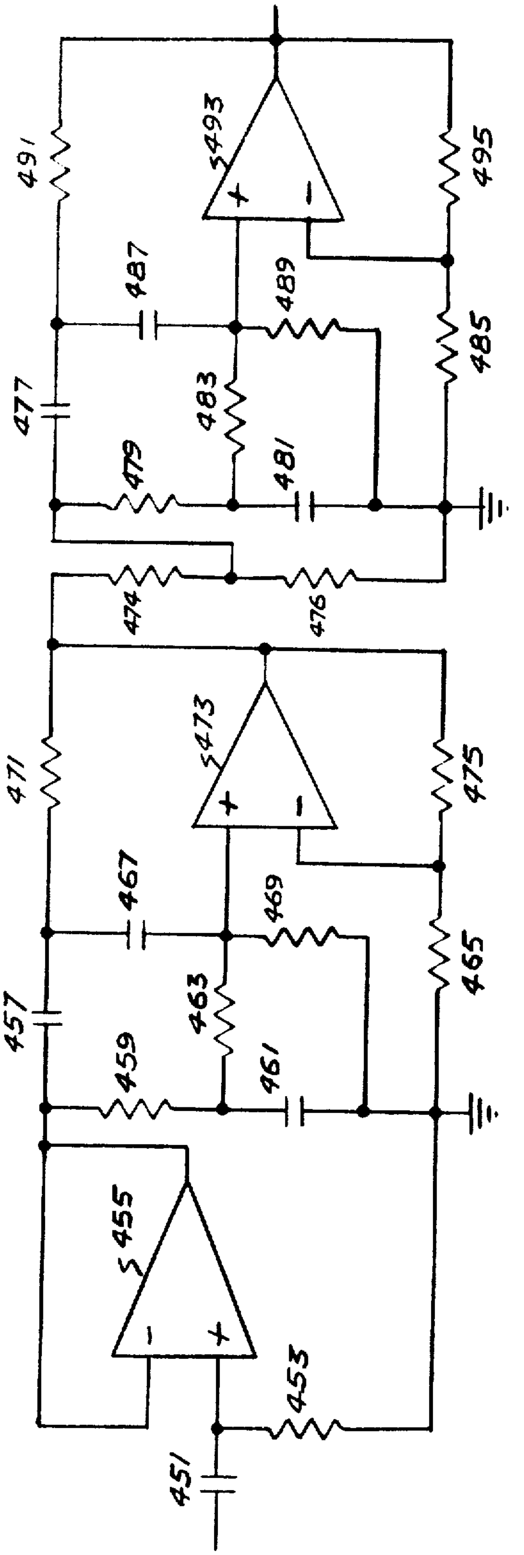
Figure 14:
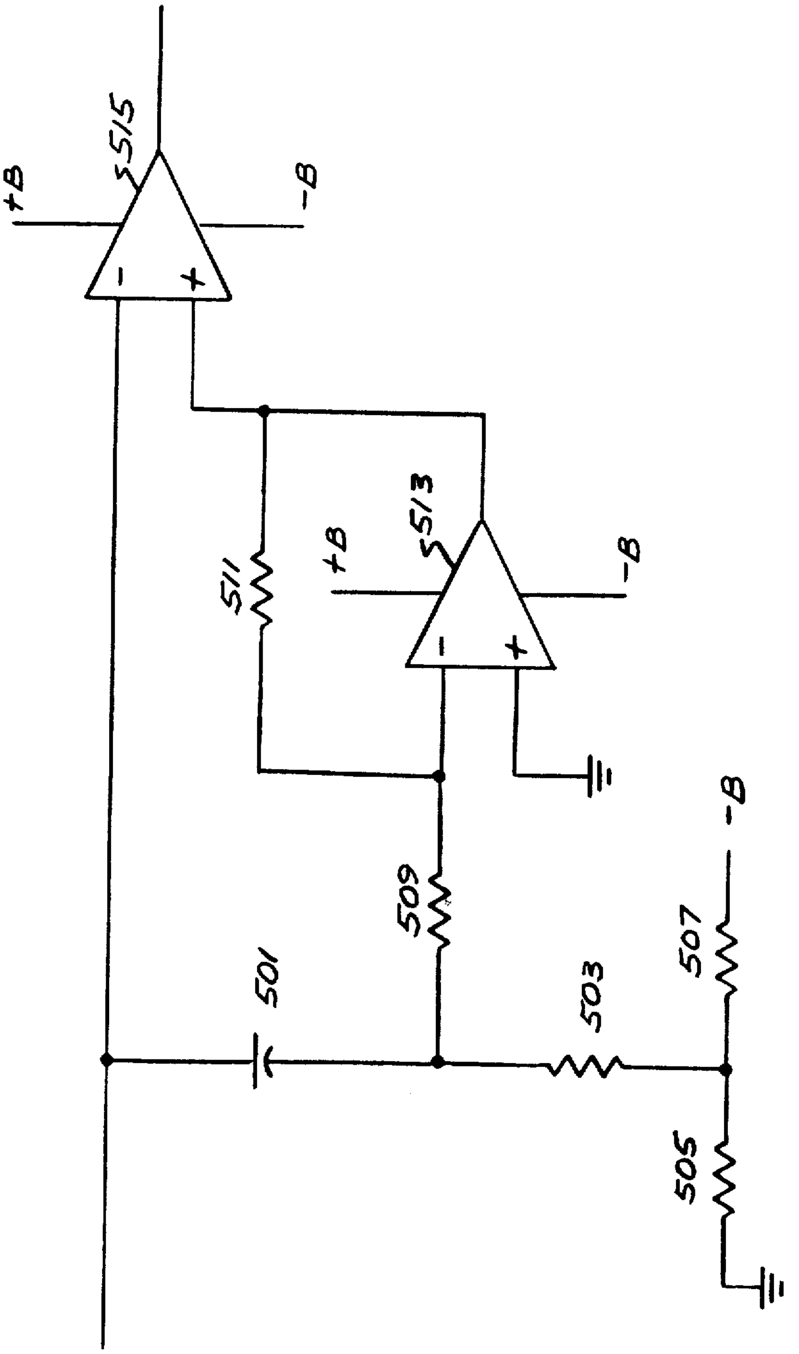

FIG. 13 is a schematic representation of the High Pass Filter used in the present invention such as filter 61 of FIG. 4; and FIG. 14 is a schematic representation of a Variable Threshold Circuit used in the practice of the subject invention, including members 115 of FIG. 6 and 137 of FIG. 7.

Referring first to FIGS. 1A through 1D, therein are disclosed graphical representations of the frequency spectrum of signals communicated through the subject invention in its various alternative modes of operation. In each instance, the frequency spectrum in Kilo-Hertz (KHz) is plotted against amplitude measured in decibels (db). The informational content of the signals being communicated is confined within the effective customer bandwidth of approximately 3000 Hertz provided for by the telephone company. As noted above, the effective customer bandwidth is slightly less than the total bandwidth of a channel which also includes a proportionately smaller band of frequencies reserved to the use of the telephone comapny for the purpose of conveying control signals and other information used in effecting the transmission of a communication.

In FIGS. 1A through 1D, the effective customer bandwidth is indicated by a dot-dash legend extending from approximately 0.3 KHz to 3.3 KHz.

Figure 1A:
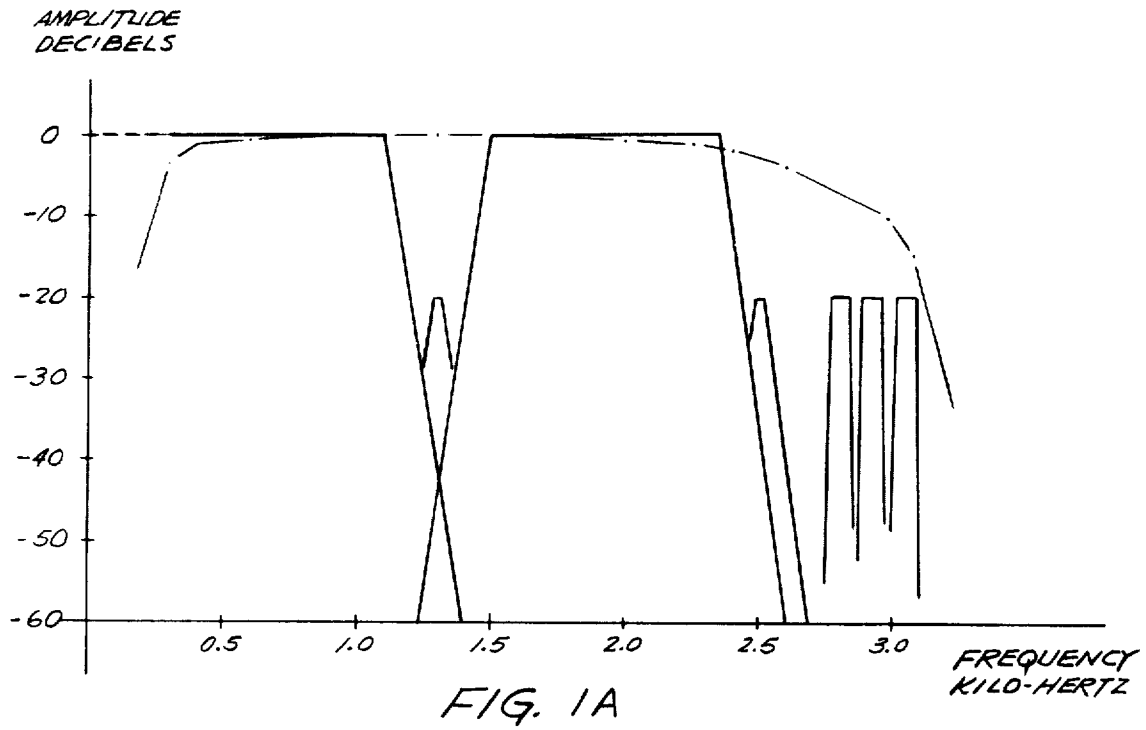
FIG. 1A is a graphical representation of the output of the subject invention when operating to communicate two voice frequency signals, associated signaling information, plus three telegraph channels.

FIG. 1A depicts the subject invention operative to communicate two voice frequency signals of abbreviated bandwidth, associated control signals, plus three telegraph channels. With respect to the voice frequency signals, it will be noted that they occupy two relatively independent frequency bands of the effective customer bandwidth. The first of these (hereinafter referred to as the low-order signal) occupies a frequency bandwidth extending from approximately 0.3 KHz to approximately 1.1 KHz, while the second signal (hereinafter referred to as the high-order signal) extends from approximately 1.5 KHz to approximately 2.3 KHz.

Two very important characteristics of the signal spectrums of abbreviated bandwidth utilized in the practice of the subject invention concerns their flatness and also their pronounced rolloff or "skirt". In this respect it is normal when speaking of effective bandwidths to measure from the point where the signal has experienced a drop of 3 db from the reference level, i.e., 3 db down; however, in the p resent instance, the skirt of the filtered output signal is so pronounced that reference, for bandwidth purposes, is made with the signal still at the zero reference level.

The effectiveness of the specific filter design employed in the practice of the present invention is further substantiated by the lack of crosstalk generated between the two voice frequency signals of abbreviated bandwidth of FIG. 1A. In this respect, at the upper frequency limits (i.e., 1.1 KHz of the low-order signal of FIG. 1A) the corresponding frequency component of the high-order signal is approximately −60 db. This compares with a rejection ratio of 1 to 1000.

In addition to eliminating crosstalk between the two abbreviated voice frequency communications, the sharpness of the skirt of these waveforms further permits the insertion within the envelope of frequency oriented space, defined as the effective customer bandwidth, of control signals associated with each of the abbreviated voice channels.

The first of the inband control signal channels is symmetrically positioned between the two abbreviated voice channels and is represented in FIG. 1A as being centered at about 1.30 KHz. The control signal channel for the second abbreviated voice channel is centered about 2.6 KHz. In accordance with standard practice, the amplitude of the control signals is approximately −20 db relative to zero reference level of the abbreviated voice frequency signals. The control signal channel is designed to accommodate the transfer of from eight to fourteen dial pulses per second and as such is provided with a frequency bandwidth of approximately 30 Hertz.

Also shown within the envelope of frequencies allocated by the telephone company to the use of the customer in FIG. 1A are three telegraph channels of limited frequency bandwidth on the order of 75 baud.

It should be noted that the telegraph communication channels are commercially available in pre-packaged plugable units and that applicants' inventive contributions in this respect centers about the simultaneous transmittibility of one or more voice communications of abbreviated bandwidths simultaneously with a plurality of telegraph signals.

Figure 1B:
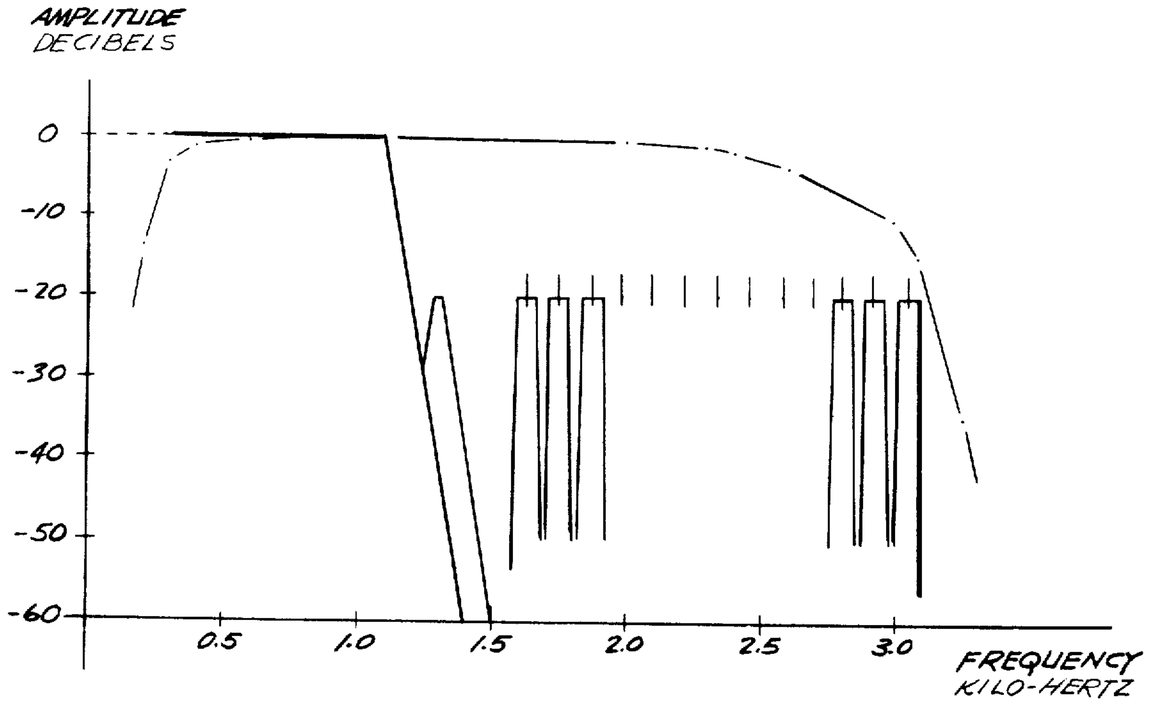
FIG. 1B is a graphical representation of the output of the subject invention when operating to communicate one voice frequency signal of abbreviated bandwidth, associated signaling information, plus 13 telegraph channels.

Referring now to FIG. 1B, therein is disclosed a graphical representation of an array of frequencies corresponding to a single abbreviated voice frequency channel with a control signal channel plus thirteen telegraph channels.

The thirteen telegraph channels correspond to the CCITT standard of 75 baud and as such are each spaced at 120 Hertz. As an alternative to the 13 75 baud telegraph channels, a lesser number of 110 baud telegraph channels may be used.

Figure 1C:
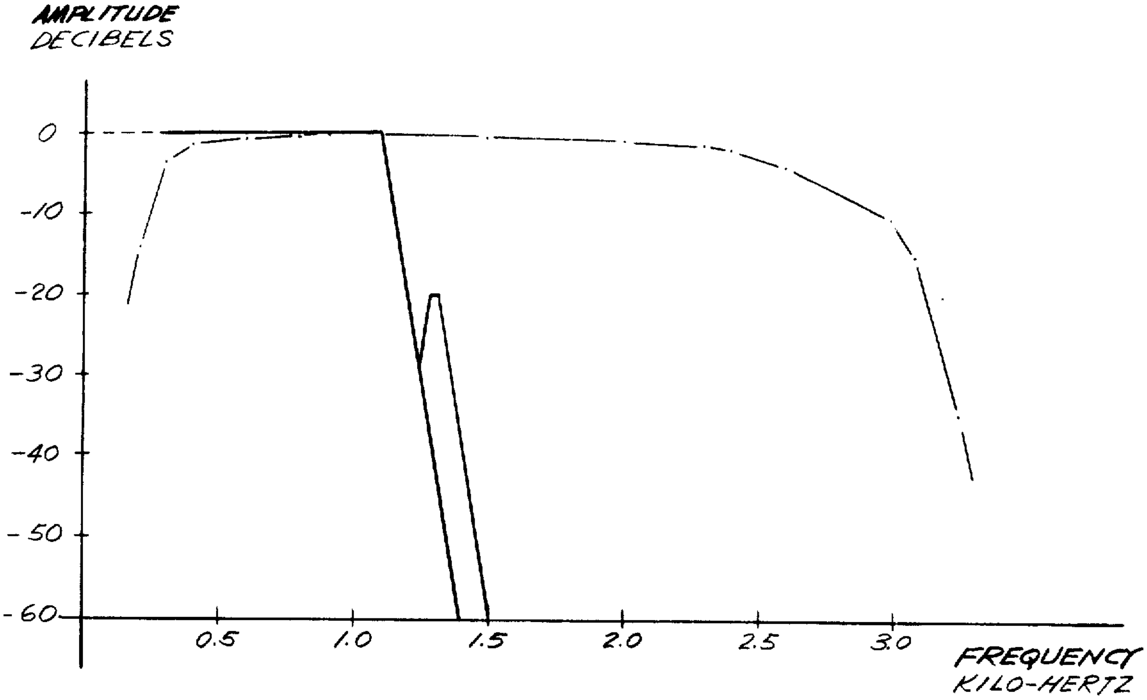
FIG. 1C is a graphical representation of the output of the subject invention when operating to communicate one voice frequency signal, associated signaling information, plus a bandwidth of approximately 1,500 Hertz for the transmission of data grade signals.

FIG. 1C depicts a further operating alternative wherein a single abbreviated voice frequency channel occupies the lower portion of the effective customer bandwidth, while the frequencies from 1.5 to 3.1 KHz are reserved to the customer for his use in accomodating the transmission of one or more channels of date. Conventional channel modem transmitter and receiver designs and/or techniques are available for such use. For example, the bandwidth still available within FIG. 1C might be used to accommodate a single data modem transmitter and receiver, having an operative capability of from 1200 to 1800 bits per second.

Figure 1D:
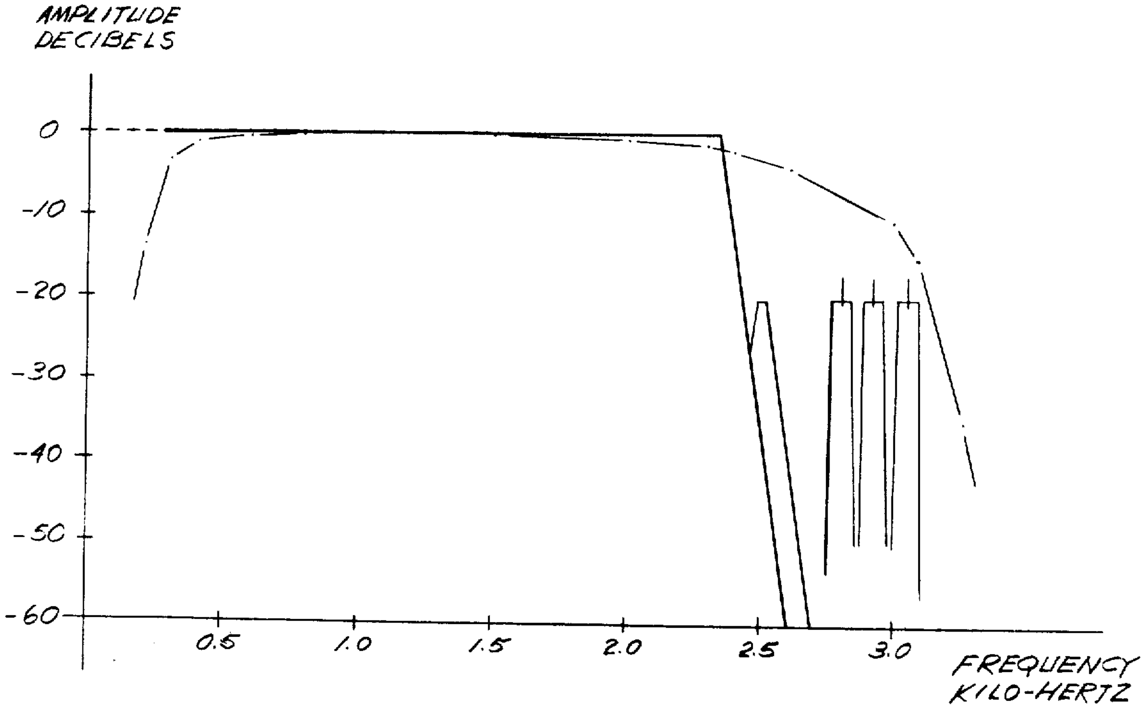
FIG. 1D is a graphical representation of the output of the subject invention when operating to communicate one voice frequency signal of conventional bandwidth, associated signaling information, plus three telegraph channels.

FIG. 1D depicts the operating capability of the present invention in an alternative mode of operation which enables the transmission of a broad band voice frequency communication signal with its control signal, plus three telegraph channels. Alternatively, the entire frequency spectrum may be utilized for the transmission of voice signals or data signals. In this respect, in each of the graphical representations of FIGS. 1A through 1D, provision is made for the simultaneous transmission of signals representing three telegraph channels. It is an obvious expedient of the present invention to modify the system such that the number of telegraph channels is increased or decreased, and in fact these may be eliminated altogether, thus affording a broader frequency bandwidth for each of the abbreviated voice frequency channels. Other variations in the organization and operation of the subject system may become apparent upon reference to the detailed description of the construction and operation of applicants' invention given with respect to FIGS. 1E through 14.

Figure 1E:
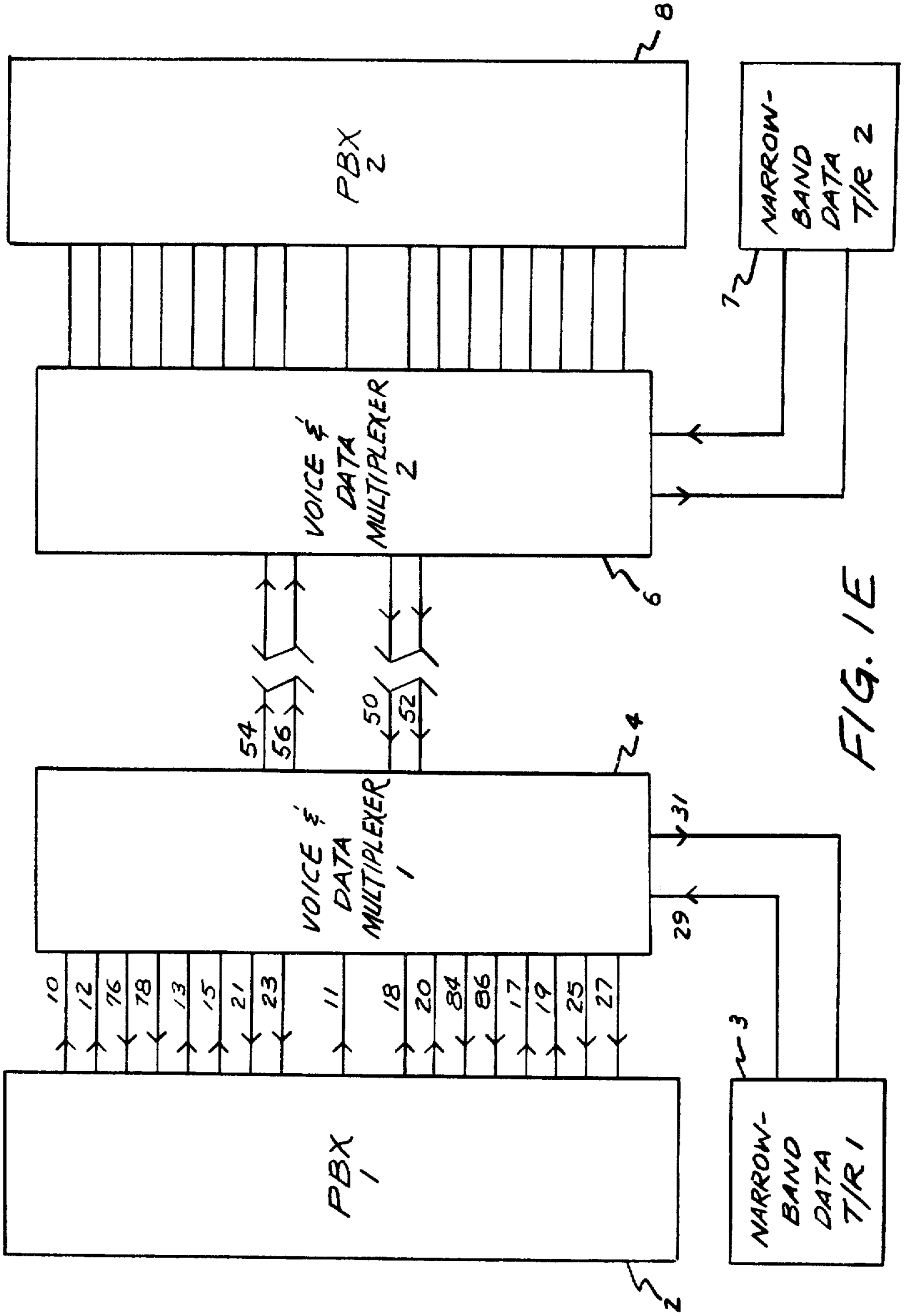
FIG. 1E is a block diagrammatic represenation of the present invention illustrated as interfacing two private branch exchanges.

Turning now to FIG. 1E, therein is disclosed a block diagrammatic representation of a four-wire telephone communication system embodying the subject invention. More specifically, there is disclosed a first Private Branch Exchange (PBX 1) identified in the drawings as member 2, having connected thereto a first Voice and Data Multiplexer, identified in the drawing as member 4. At a remote location is a second Private Branch Exchange (PBX 2) having associated therewith a second Voice and Data Multiplexer identified in FIG. 1E as member 6. For purposes of explanation, it may be assumed that the first PBX and its associated Voice and Data Multiplexer is located a substantial geographical distance from the second PBX and its associated Voice and Date Multiplexer. Narrow Band Data Transmitters/Receivers 3 and 8 are provided to accommodate the transmission of coded information.

The private branch exchange (PBX or PABX) is a conventional device, a simple example of which is a switchboard which enables a subscriber such as a businessman having plural handsets to selectively switch a lesser number of subscriber lines to the various handsets. In this manner a limited number of lines may be shared between a larger number of telephone sets with the added advantage of enabling connections between telephones within the office being served by the private branch exchange.

Long-distance communications through a PBX are conventionally handled as a normal toll call; however, sometimes a group of circuits is provided between two private branch exchanges. Such circuits are known as tie lines and are particularly pertinent to the subject of the present invention. Thus a large corporation having offices on both the east and west coasts, may find it economically to their advantage to facilitate the telephone communication therebetween by way of a tie line which may be used exclusively to connect extensions at the two office locations, or possibly have the added capability of enabling the extensions at either end to complete calls to anyplace in the public sector. In any event, the telephone company imposes strict operating standards on the operation of the tie lines. This, coupled with the substantial installation and operational costs of the lines results in a fairly expensive facility.

Normally, in order to increase the message-carrying capability of two PBXs interconnected by way of a tie line, it is necessary to increase the number of tie lines proportionately to satisfy the increased demand in service. This in turn necessitates the cooperation of the telephone company whose tie line facilities are being used with the resultant increase in cost for the use of these facilities.

The telephone company in turn will probably meet the increased demand by dedicating an additional channel of the carrier system to which present facilities are tied into. By way of the present invention, it is possible to at least double the voice frequency message-carrying capability of each tie line and/or facilitate the transfer of one or more channels of coded information. This increase in operating capability is provided without intervention on the part of the telephone company, and in fact there is no need and little opportunity for the telephone company to become aware of the existence of the added operating capability, since the operation is entirely within the standards established by the telephone company and the plural information signals and the associated control signals are entirely contained within the envelope heretofore designated as the effective customer bandwidth.

In summary, FIG. 1E depicts two private branch exchanges being interfaced to one another through associated Voice and Data Multiplexers. The Voice and Data Multiplexers are further interconnected via a conventional four-wire tie line facility represented generally in FIG. 1E as members 50, 52, 54, 56. Included in the four-wire tie line facility are the components comprising the telephone plant. These comprise the service normally used to connect the PBX to the local central office of the telephone company, the toll line connecting the local central office associated with the first PBX to a similar local central office associated with the second PBX, and the switching equipment at the local central offices necessary to support the toll line operation. Since, in the preferred embodiment of the present invention all signaling information is contained within the envelope defined as the effective customer bandwidth, the switching function performed at the local central offices is unaffected.

Figure 2:
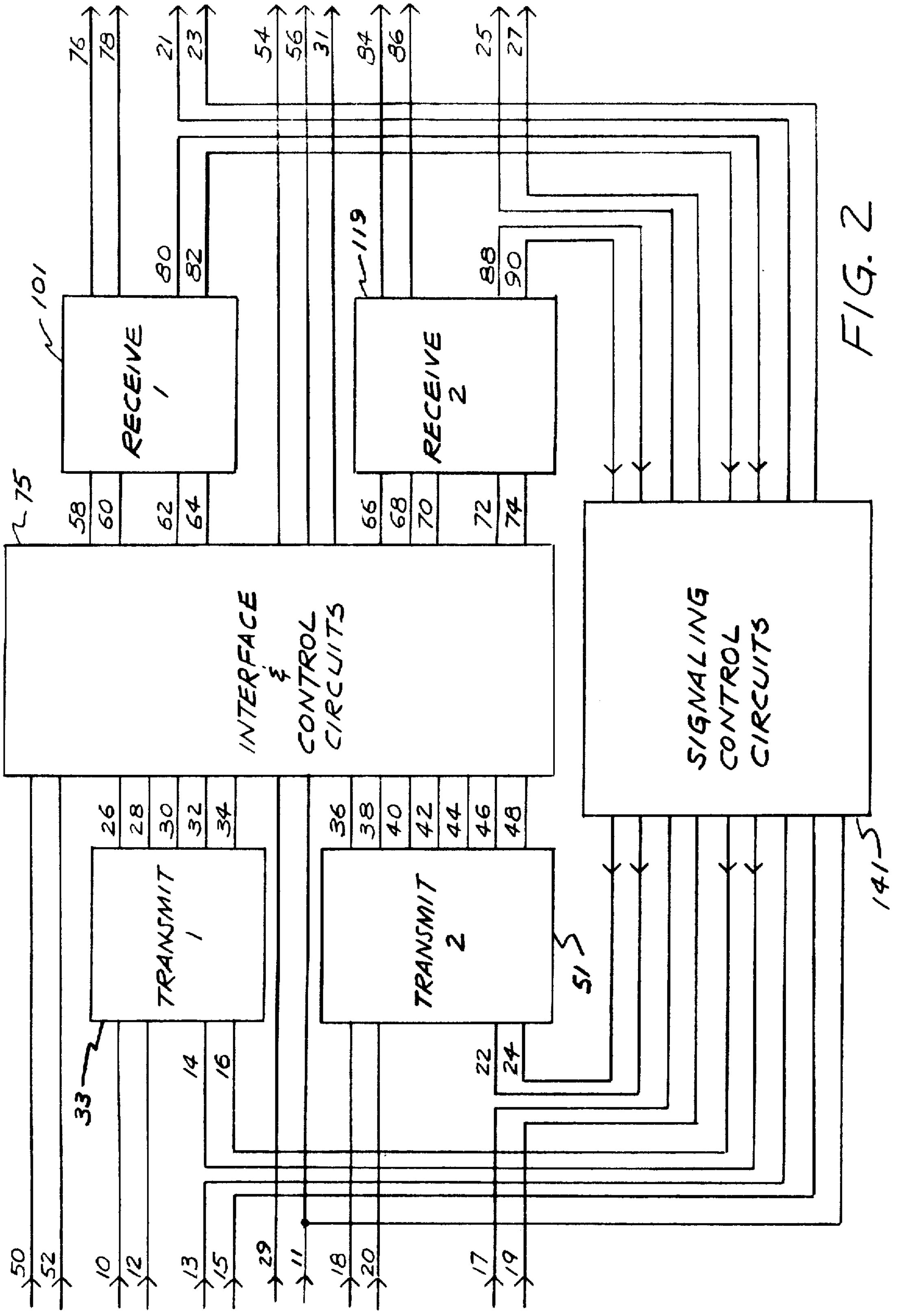
FIG. 2 is a block diagrammatic representation of the subject invention represented generally in FIG. 1E.

Before turning to FIG. 2, it should be noted with respect to FIG. 1E that the Voice and Data Multiplexer is coupled to its associated PBX via a number of interconnecting leads. The leads connecting members 2, 3 and 4 are numbered and the natrue of the information carried thereon will be apparent from the detailed description which follows. However, it should be noted that a corresponding number of leads is used to interconnect the Voice and Data Multiplexer number 2 with the PBX number 2.

Turning now to FIG. 2, therein is disclosed a more detailed representation of the Voice and Data Multiplexer 1 of FIG. 1E. Included in FIG. 2 are the six specific subunits comprising the Voice and Data Multiplexer. To the extreme left of FIG. 2 are the lines carrying information and control signals into the Voice and Data Multiplexer as indicated by the direction of the arrow. Similarly, to the extreme right of FIG. 2, are the lines for transferring information and control signals out of the Voice and Data Multiplexer.

The six subunits comprising the Voice and Data Multiplexer include a first transmitter 33 which functions to transmit the full bandwidth voice frequency signals or, alternatively, one of the abbreviated bandwidth voice frequency signals. A second transmitter 51 is used to transmit the other abbreviated bandwidth voice frequency signal; however, portions thereof are used in other capacities when the Voice and Data Multiplexer functions to transmit a full bandwidth voice frequency signal or when the frequencies above 1.5 KHz are dedicated to the transmission of coded information. A more detailed explanation of the construction and operation of the first and second transmitters 30 and 51 is given with respect to the explanation of FIGS. 3 and 4.

In addition to a first and second transmitter, each of the voice and Data Multiplexers contains a first and second Receive section depicted in FIG. 2 as members 101 and 119, respectively. A more detailed explanation of the construction and operation of the Receive sections 101 and 119 is given with respect to FIGS. 5 and 6, respectively; however, in general, these members operate in a manner which complements the operation of their associated transmitters 33 and 51 in the various alternative modes of operation of the Voice and Data Multiplexer.

For purposes of facilitating the various modes of operation of the Voice and Data Multiplexer, there is provided Interface and Control Circuits 75 which, together with other portions of the subject invention, is interfaced between the PBX and the four-wire telephone circuit. A more detailed explanation of the Interface and Control Circuits 75 is given below with respect to the explanation of FIGS. 5 and 9.

As indicated above, in the practice of the invention, the voice, data and signaling information are all communicated within the envelope of frequencies heretofore referred to as the effective customer bandwidth. The ability to accommodate the signaling information transfers entirely within the effective customer bandwidth is critical to the practice of the present invention since, when the system is in that mode of operation whereby two abbreviated voice frequency signals are being communicated simultaneously, steps must be taken to insure that the parties utilizing respective ones of said abbreviated voice frequency channels can dial directly, but independently, parties at the other end of the tie line, and that such dialing does not interfere with the voice communications or with the dialing operation on the other channel. At the same time, the transfer of signaling information via the tie line must be within the signaling standards established by the telephone company so as not to interfere with other communications being channeled through the public sector of the telephone system.

In the operation of the present invention, the routing of the signaling information is handled somewhat independently of transmission of the voice portion of the communication. Thus, Signaling Control Circuits 141 are provided for selectively routing the signaling information. A more detailed representation and explanation of the Signaling Control Circuits 141 of FIG. 2 is given below with respect to FIG. 8.

Figure 3:
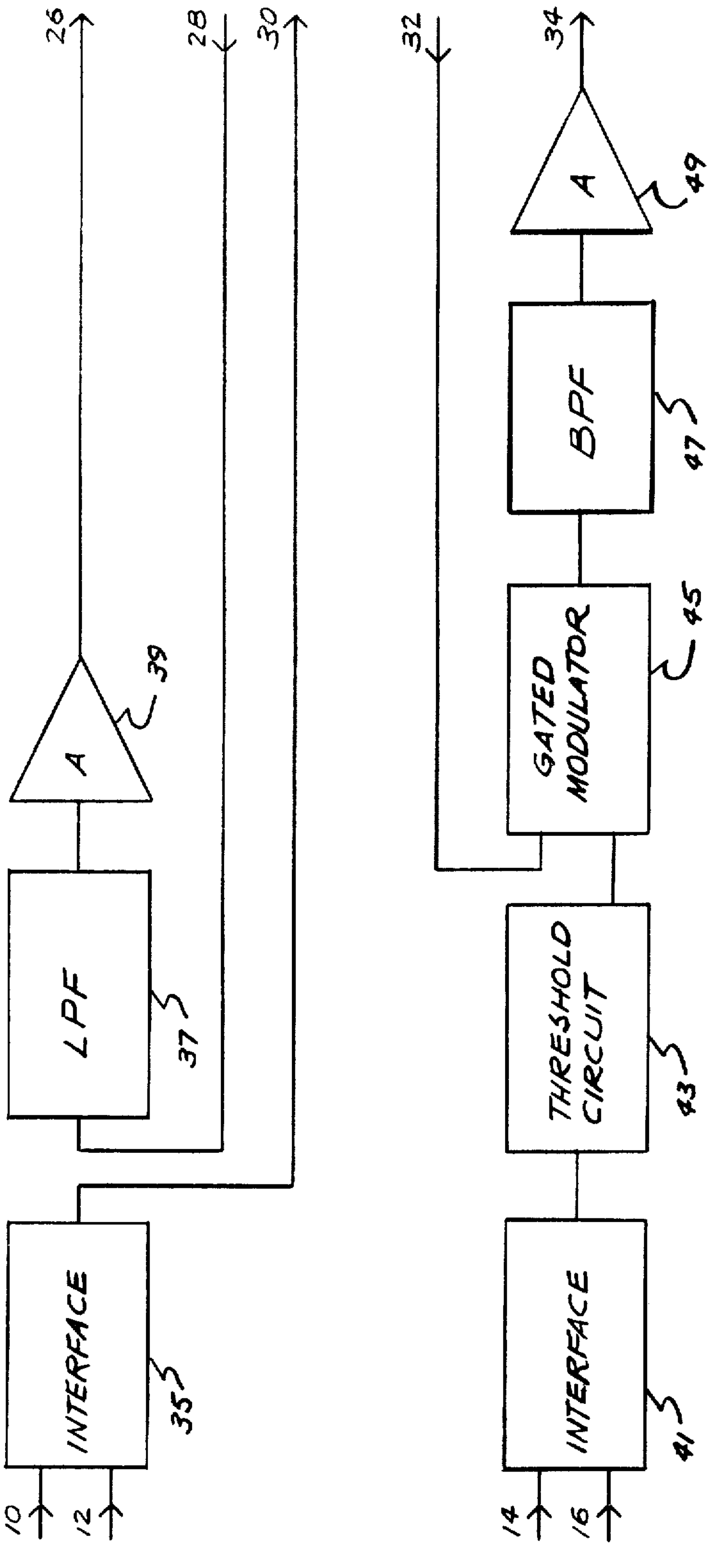
FIG. 3 is a block diagrammatic representation of the Transmit 1 portion of FIG. 2.

Turning now to FIG. 3, therein is disclosed a block diagram of the Transmit 1 portion of FIG. 2, comprising an Interface 35 which serves an impedance-matching function for the voice frequency signals being inputted into Voice and Data Multiplexer 1 from PBX 1 via lines 10 and 12. As indicated above, Transmit 1 functions during all of the various alternative modes of operation of the subject invention; however, the manner in which the voice frequency signals are conducted therethrough depends on the mode of operation of the system. In this respect, when operating to transmit voice frequency signals of abbreviated bandwidth, the input signals to the Interface 35 are normally coupled to a Low Pass Filter 37 via lines 30 and 28, the latter being interconnected in the Interface and Control Circuits 75 of FIG. 2 by switching means disclosed in detail in FIG. 9 and discussed more fully below. In the preferred embodiment of the present invention the Low Pass Filter 37 functions to filter out frequency components about 1100 Hertz. The Low Pass Filter 37, acting in conjunction with the low frequency cutoff of approximately 300 Hertz afforded by the telephone company's transmission standards yields a bandwidth of approximately 800 Hertz for the low-order signal. The output of the Low Pass Filter 37 is amplified in a conventional amplifier 39 before being transferred to the Interface and Control Circuits 75 of FIG. 2. Although the figure of 800 Hertz given herein pertains to the preferred embodiment of the present invention, other bandwidths may be used without varying from the spirit of the invention.

The dial signals generated in conjunction with the low-order voice frequency communication must be modulated on a carrier of 1300 Hertz in accordance with frequency allocated to the low-order signal channel as shown in FIG. 1A. In a conventional telephone such as is normally used in conjunction with the present invention, the lifting of the handset from its cradle releases an activating switch built into the cradle such that a circuit is closed to establish an "off-hook" condition in the telephone system. The aforementioned off-hook condition completes a circuit from ground, through the activating switch of the cradle, to a battery located in the PBX so as to signal the fact that the person holding the handset wishes to make a call. The local PBX acknowledges this request by making available an appropriate interconnecting line to enable the caller to dial his party. This acknowledgment is communicated to the user of the handset by the conventional "dial tone". In the case of a local call, the allocated line for completing the call may be one of several lines available for this purpose, in which event the switching equipment of the local central office is brought into play. Alternatively, if the call is between distant stations it may involve the use of a toll connecting trunk or an intertoll trunk. In the practice of the present invention involving a communication over long distances, via a tie line, a request for a line results in the temporary allocation by the telephone company of one channel of a multi-channel carrier system which may involve any of the ten or so different carrier systems currently in use by the telephone company.

It should be noted that although the tie lines are in essence dedicated facilities permitting unlimited use to the subscriber between the two interconnected stations, the transmission of the communications between the two stations involves the use of facilities which are otherwise shared with other subscribers. More specifically, that portion of the communication system which lies between the PBX and the local central office involves more or less fixed equipment; however, the balance of the call will be routed via whatever facilities are conveniently available in the telephone company. Thus, a user of the present invention, having facilities in New York and San Francisco, may, for purposes of completing a single call, be allocated a route involving interconnecting lines from New York to Chicago to San Francisco, or, alternatively, a direct line from New York to San Francisco, or even one from New York to Atlanta to New Orleans to San Francisco. Normally the subscriber has no knowledge as to how his communication is being routed, since the standards of the telephone company should insure good communication independent of the route taken.

Upon hearing the dial tone, the user of a conventional telephone, such as is used in the practice of the present invention, commences to dial the number of the party he wishes to reach. In the conventional dial phone, this results in the generation of a succession of pulses which reach the ear of the dialer as a succession of clicks. In reality, the clicks correspond to the making and breaking of the same circuit which was completed by the caller upon lifting the handset from the cradle. The make-break action takes place at an undefined frequency of between 8 and 14 pulses per second. It is this dialing information which is used to activate the ringer of the party being called.

In the preferred embodiment of the present invention, the dial signals must be modulated to a value which will not interfere with either the abbreviated or full bandwidth voice communication signals or the data signals. At the same time the dial signals must be transmitted entirely within the frequency bandwidth defined as the effective customer bandwidth so as not to interfere with other communications being handled by the telephone company, such as communication signals within the other channels of a multi-channel carrier system. It should be further noted that the dial signal channel at 1300 Hertz, used to transmit dial signals associated with the low-order voice frequency signals of abbreviated bandwidth, is not available when a full bandwidth voice frequency signal is being communicated. The manner of facilitating the signaling for the various alternative modes of operation will be explained more fully with respect to the explanation of the Signaling Control Circuits 141 of FIG. 2 as given with respect to FIG. 8. For present purposes it is sufficient to note that when the system operates to transmit a low-order voice frequency signal of abbreviated bandwidth, the dial signals generated in the calling party's telephone are inputted into the Voice and Data Multiplexer of FIG. 1 via lines 13 and 15 whereafter these signals are routed through the Signalling Control Circuits 141 of FIG. 2, in a manner more fully explained with respect to FIG. 8, and are thereafter inputted into Transmit 1 via lines 14 and 16. The dial signals on lines 14 and 16 are shown in FIG. 3 as being inputted into Interface member 41 which essentially serves to match their impedance with that of the associated circuitry. The output of Interface 41 is inputted into Threshold Circuit 43 which functions to sharpen the dialing signals prior to their being modulated in a Gated Modulator 45.

Gated Modulator 45 is simply a gate of conventional design which functions to pass or not pass 1300 Hertz bursts of tones at the dial rate. The output of the Gated Modulator 45 appears as a series of low frequency pulses relative to a 1300 Hertz reference signal. The output of the Gated Modulator 45 is in turn inputted into Band Pass Filter 47 which, as indicated above, may be of conventional design and which functions to pass a narrow band of frequencies sufficient in width to accommodate the dialing information. In the preferred embodiment of the present invention, the Band Pass Filter has a 30 Hertz, 3 db bandwidth about the central frequency. For the Band Pass Filter 47 the central frequency is 1300 Hertz, which corresponds to the carrier frequency of the Gated Modulator 45. The output of the Band Pass Filter 47 is amplified in member 49 before being transferred to the Interface and Control Circuits 75 of FIG. 2 via line 34.

FIG. 4 is a block diagrammatic representation of the Transmit 2 portion of FIG. 2 represented therein as member 51. The function and organization of the components of FIG. 4 are similar to those of FIG. 3, except that whereas the low-order voice frequency signals are transmitted at their original (though abbreviate) frequencies, the high-order voice frequency signals transmitted via Transmit 2 must be modulated prior to transmission so as to avoid interference with the low-order communication. To this end, the voice frequency signals generated by a caller using the high-order voice frequency channel of abbreviated bandwidth are inputted into the subject invention from PBX 1 via input lines 18 and 20 from whence they pass into Interface 53, which again, may be an impedance-matching device of conventional design. After leaving the Interface 53 the input signals are filtered in Low Pass Filter 55 to remove frequency components above 1100 Hertz. The Low Pass Filter 55 is identical to the Low Pass Filter 37 of FIG. 3, both of which are disclosed in detail in FIG. 10. The output of the Low Pass Filter 55 comprises a spectrum of frequencies having a bandwidth of 800 Hertz extending from approximately 300 Hertz to approximately 1100 Hertz.

To avoid interference with the low-order voice communication, the output of the Low Pass Filter 55 is modulated in Modulator 57 by means of a 2600 Hertz carrier. At the output of the Modulator 57 the high-order voice frequency communication occupies that portion of the effective customer bandwidth between approximately 1500 Hertz and 2300 Hertz.

The high-order voice frequency communication of abbreviated bandwidth is inputted into a Low Pass Filter 59 after being routed through the Interface and Control Circuits 75 of FIG. 2 on lines 42 and 40. Low Pass Filter 59 has a cutoff frequency at approximately 2300 Hertz, thus essentially precluding any frequencies above that value from getting through. Low Pass Filter 59 is of similar though not identical construction as the Low Pass Filter 55. An explanation of these differences is given below with respect to FIG. 10. After passing through Low Pass Filter 59, the high-order voice communication of abbreviataed bandwidth is further filtered in the High Pass Filter 61 which functions to further reduce frequency components below 1500 Hertz. The output of High Pass Filter 61 is amplified by means of amplifier 63 whereafter the signal is transferred to the Interface and Control Circuits 75 of FIG. 2.

In addition to accommodating the transmission of the high-order voice frequency communication of abbreviated bandwidth, the Transmit 2 portion of the Voice and Data Multiplexer functions in combination with the circuitry of FIG. 1 to accommodate the transfer of the full bandwidth voice frequency communication. An explanation of the system operating in the latter mode of operation will be delayed, pending development of other portions of the subject system involved in that operation.

The handling of the dial signals for the high-order voice communication of abbreviated frequency is effected in a manner similar to that involved in FIG. 3. In this respect, the dial signals generated by a caller using a second channel of abbreviated bandwidth between PBX 1 and PBX 2 appear on lines 22 and 24 where they are interfaced via member 65 to Threshold Circuit 67 which is identical in construction to that of Threshold Circuit 43. The output of the Threshold Circuit 67 is modulated in a second Gated Modulator 69 before being presented to Band Pass Filter 71 and is thereafter amplified in member 73 before being returned to the Interface and Control Circuits 75 of FIG. 2 via line 48.

Figure 5:
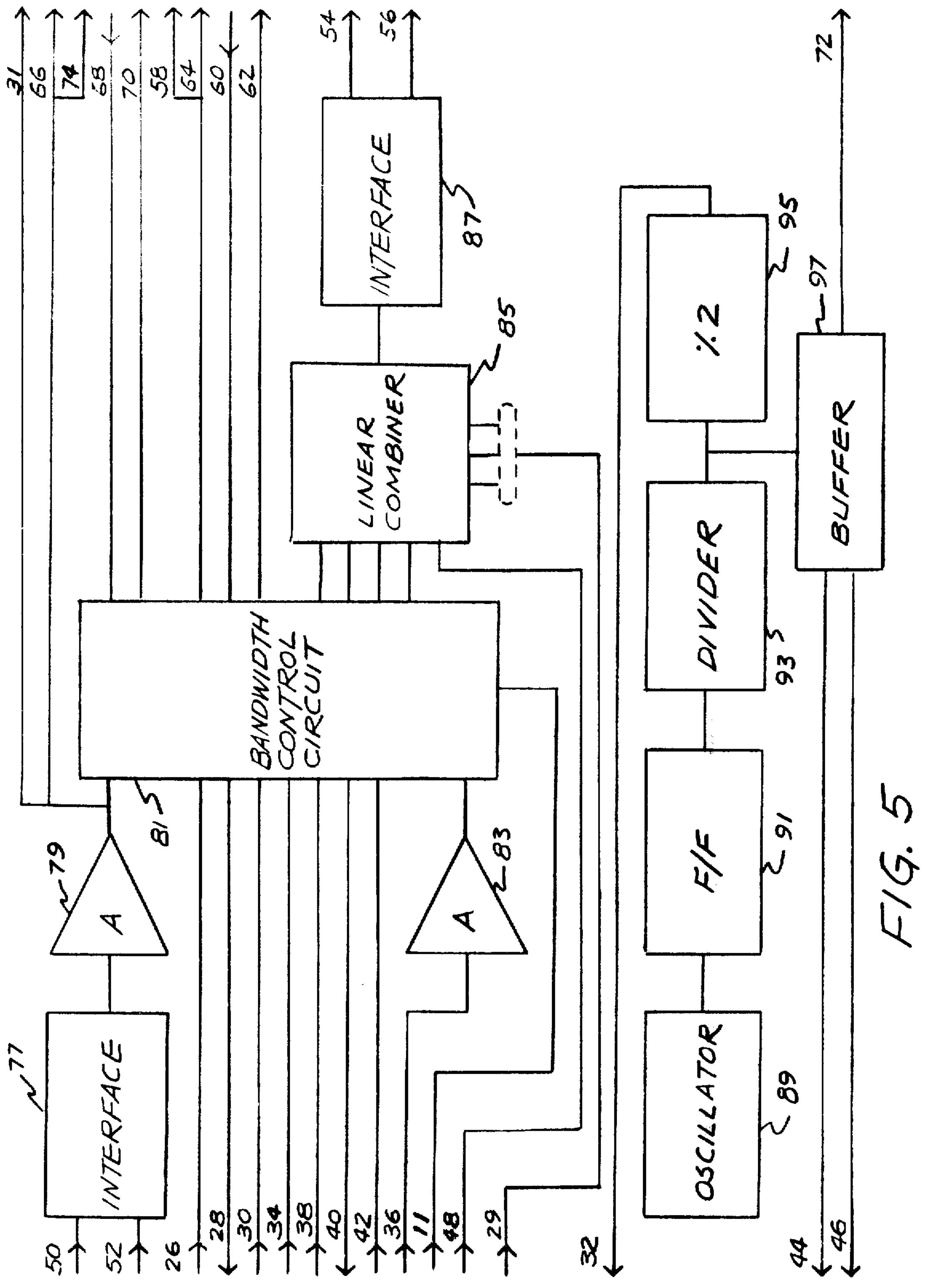
FIG. 5 is a block diagrammatic representation of the Interface and Control Circuits portion of FIG. 2.

Reference is now made to FIG. 5 which discloses in detail the contents of the Interface and Control Circuits 75 of FIG. 2. In addition to the lines leading into the Interface and Control Circuits 75 from the Transmit 1 and Transmit 2 portions of the system as discussed above, as well as from the input side of the four-wire telephone communications system, there is also disclosed in FIGS. 2 and 5 a control lead 11 which serves to switch the system between its various alternative modes of operation.

In the preferred embodiment of the present invention, switching information conveyed to the system via line 11 is limited to the determination of whether the system is operative to communicate voice frequency signals of full or abbreviated bandwidth or whether the high-order voice frequency channel of abbreviated bandwidth is to be devoted to the transmission of coded information. It should be understood, however, that the latter mode of operation further involves the physical substitution of a portion of the circuit comprising Transmit 2. A further appreciation for the function and operation of the signals on input line 11 of FIG. 5 will be apparent upon reference to FIG. 9 which discloses the details of the Bandwidth Control Circuit 81 of FIG. 5. In this respect the Bandwidth Control Circuit 81 is comprised essentially of a switching network including ganged switches adapted to switch to one or another of two operative states depending upon the status of a Switch Control mechanism associated with the input lead 11. The two operative states of the Bandwidth Control Circuit correspond to the alternative modes of operation of the subject system which involve the transmission of a voice frequency signal of full bandwidth or abbreviated bandwidth, respectively.

Figure 9:
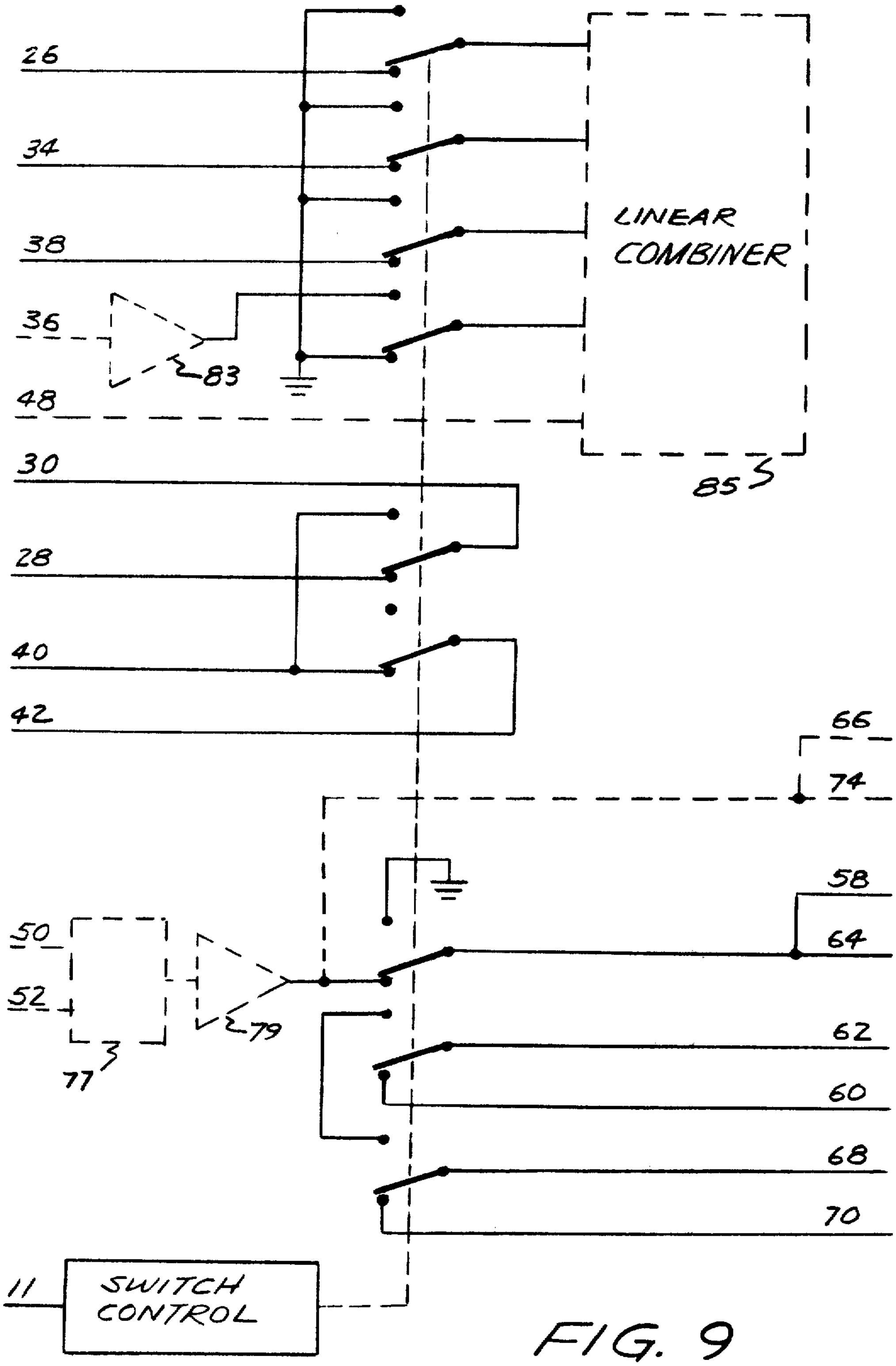
FIG. 9 is a more detailed representation of the Bandwidth Control Circuit of FIG. 5.

Referring now to FIGS. 2, 3, 4, 5 and 9, it is apparent that when the system operates to transmit a voice frequency signal of full bandwidth, the voice portion of the communication is inputted into Transmit 1 via input lines 10 and 12 where, after being interfaced through member 35 the input signals are transmitted via line 30 to the Bandwidth Control Circuit portion of the Interface and Control Circuits 75 of FIG. 2. In this mode of operation the Switch Control of FIG. 9 is activated by an input signal from line 11 so that the switch arms are thrown to the opposite poles from that indicated. Thus, under these conditions the voice frequency signals on line 30 of FIG. 3 are connected to line 40 of FIG. 4 via the Bandwidth Control Circuit 81 of FIG. 5 as seen in FIG. 9. The voice frequency signals on line 40 are inputted into the Low Pass Filter 59, which as mentioned above, operates to limit the frequency components of the input signal to values below 2300 Hertz. Thus, at the output of the Low Pass Filter 59 the effective bandwidth of the voice frequency signals includes all frequency components between approximately 300 and 2300 Hertz. The output of the Low Pass Filter 59 is connected via line 36 through an amplifier 83 into the Bandwidth Control Circuit 81, where it is routed into a Linear Combiner 85. The Linear Combiner 85 is in essence a conventional summing device which permits an analog addition of signals from any one of a plurality of sources to be gated thereto for transmission purposes without fear of producing any feedback of the input signal into other portions of the circuit connected to the common transmission point. In essence, the Linear Combiner isolates the plural input leads to the transmit point, one from another.

From the Linear Combiner 85, the full bandwidth voice frequency signals are inputted into an Interface 87 for transmission on the output leads 54 and 56 of the tie line comprising the four-wire telephone communication system.

In the bottom portion of FIG. 5 is shown a signal generating unit which functions to generate the 1300 and 2600 Hertz signals used to modulate the high-order voice communication of abbreviated bandwidth in member 57 of FIG. 4 and also to modulate both the high-order and low-order control signals in member 69 of FIG. 4 and 45 of FIG. 3, respectively.

Included in the signal generating circuitry of FIG. 5 is an Oscillator 89 which comprises a conventional crystal oscillator having a fixed frequency of 5.2 Megahertz. The output of Oscillator 89 is inputted into a Flip Flop 91 which serves to square-up the essentially sinusoidal output of the Oscillator 89 while at the same time reducing the frequency thereof by a factor of 2. Accordingly, the ouput of member 91 appears as a square wave having a frequency of 2.6 Megahertz. This signal is next inputted into a Divider 93 which may be of conventional design and which functions to reduce by a factor of 1000 the frequency of the input signal thereto. Thus the output of Divider 93 is the desired 2600 Hertz signal to be used in modulating the high-order voice and dial signals of FIG. 4. These signals appear on lines 44 and 46 which are shown in FIG. 5 as being derived from the output of Divider 93 after being buffered in member 97, the latter device serving to isolate the output signals from their source in a conventional manner.

Also derived from the output of the Divider 93 is the 1300 Hertz signal used to modulate the low-order dial signals in FIG. 3. The 1300 Hertz modulating signal is derived by further reducing the output of Divider 93 by a factor of 2 in member 95 which, as with member 91, may comprise a Flip Flop.

Turning now to FIGS. 6 and 7, therein is disclosed in diagrammatic manner the Receive circuits for the low and high-order channels, respectively. FIG. 6 corresponds to the Receive 1 portion of FIG. 2, being therein represented as member 101. Receive 1 functions to remove the low-order voice communication and dial signals from incoming communications originating in PBX 2 and entering PBX 1 on lines 50 and 52. It will be noted from FIGS. 2, 5 and 9 that signals on lines 50 and 52 are routed into the Receive 1 and Receive 2 circuits of FIGS. 6 and 7 via lines 58, 64, 66 and 74. It will be further noted that the input signals on lines 50 and 52 are always routed into the Receive 2 circuits of FIG. 7 on lines 66 and 74, whereas these same input signals are routed into the Receive 1 circuits of FIG. 6 only when the system is operative to receive and transmit low-order voice communications of abbreviated bandwidth.

The incoming voice and dial signals which appear in combined form on input leads 50 and 52, are separated by being filtered and demodulated as need be in the Receive circuits of FIGS. 6 and 7. Thus, the Low Pass Filter 103 of FIG. 6 functions to separate out signals above 1100 Hertz. The lower frequency voice signals are amplified in member 105 before being routed via line 60 to line 62 in the switching circuit of FIG. 9, whereafter the remaining signals having a bandwidth of approximately 800 Hertz and comprising the low order voice communication of abbreviated bandwidth, are interfaced via member 107 to the Receive portion of the telephone handset connected to the low order channel via PBX 1.

Somewhat similarly, Low Pass Filter 121 of FIG. 7 functions to separate out frequency components below 2400 Hertz of the input signals on lines 50 and 52. The output of Low Pass Filter 121 is routed to Modulator 123 wherein the signals are demodulated before being inputted into Low Pass Filter 125 wherein frequency components above 1100 Hertz are removed. To understand this relationship, it should be noted that in the Transmit portion of FIG. 4 corresponding to the high-order signal of abbreviated bandwidth, the informational content of the signal between roughly 300 Hertz and 1100 Hertz is modulated by means of a Modulator 69, the latter being a double side band modulator. The double side band nature of the modulation technique yields a sum and difference signal about the modulating frequency of 2600 Hertz. Thus, a 600 Hertz voice frequency component in the original signal is modulated to yield a 3200 Hertz signal and a 2000 Hertz signal. Note that the sum signal is filtered out by the 2300 Hertz Low Pass Filter 59 and likewise the High Pass Filter 61 operates to filter out frequency components below 1500 Hertz. Thus, when the signal is inputted into the equivalent Low Pass Filter 121 of Voice and Data Multiplexer 2 after being transmitted, it must be demodulated by Modulator 123 in such fashion that the mirror image frequencies generated in conjunction with the transmit step as depicted in FIG. 4 must be inserted to recover the original frequency distribution. This is done by utilizing the same type of modulator for demodulation purposes as was used in the original modulation operation. The Modulator 123 generates a sum and difference signal about the modulating frequency of 2600 Hertz. Thus, the original component of 600 Hertz which was converted upon transmission to 2000 Hertz appears at the output of Modulator 123 as a sum signal at 4600 Hertz and a difference signal, the original 600 Hertz component. The Low Pass Filter 125 which is an 1100 Hertz filter filters out the components above 1100 Hertz, including the 4600 Hertz frequency component.

Having now demodulated and separated the high-order and low-order voice communications, reference is now made to the lower portions of FIGS. 6 and 7 wherein is shown those portions of Receive 1 and Receive 2 concerned with the interpretation of the signaling portion of the high-order and low-order communications. More specifically, input signals on lines 64 and 74 are inputted into Band Pass Filters 109 and 131, respectively. Each of the Band Pass Filters 109 and 131 is tuned so as to remove frequency components other than a narrow band of frequencies centered about the control signal frequency associated with the particular channel. As indicated above, for the low-order voice communication channel, the control signal frequency is 1300 Hertz, whereas for the high-order channel the control signal frequency is 2600 Hertz. The bandwidth of frequencies passed by the Band Pass Filters 109 and 131 is approximately 30 Hertz measured at a −3 db.

After being amplified in Amplifiers 111 and 133 of FIGS. 6 and 7, respectively, the signaling information is inputted into FullWave Detectors 113 and 135 which function in a conventional manner to demodulate the signaling information by removing therefrom the envelope of the modulating waveform applied thereto by the corresponding transmitters associated with the Voice and Data Multiplexer No. 2. After being demodulated the signaling information is inputted into Variable Threshold Circuits 115 and 137 of FIGS. 6 and 7 respectively. The Variable Threshold Circuits are of particularly novel structure, being designed to compensate for variations in the reference level of the dialing signals which tend to become distorted in transmission over particularly long distances. The details of the Variable Threshold Circuit are explained more fully below in connection with FIG. 14.

After having had their reference level stabilized by the Variable Threshold Circuits 115 and 137, the incoming dial signals are amplified in the Driver and Interface circuits 117 and 139 prior to being transmitted to the dial signal interpreting portion of the PBX where the informational content thereof is interpreted and a local signal generated in accordance therewith to ring the handset of the party being called.

Figure 8:
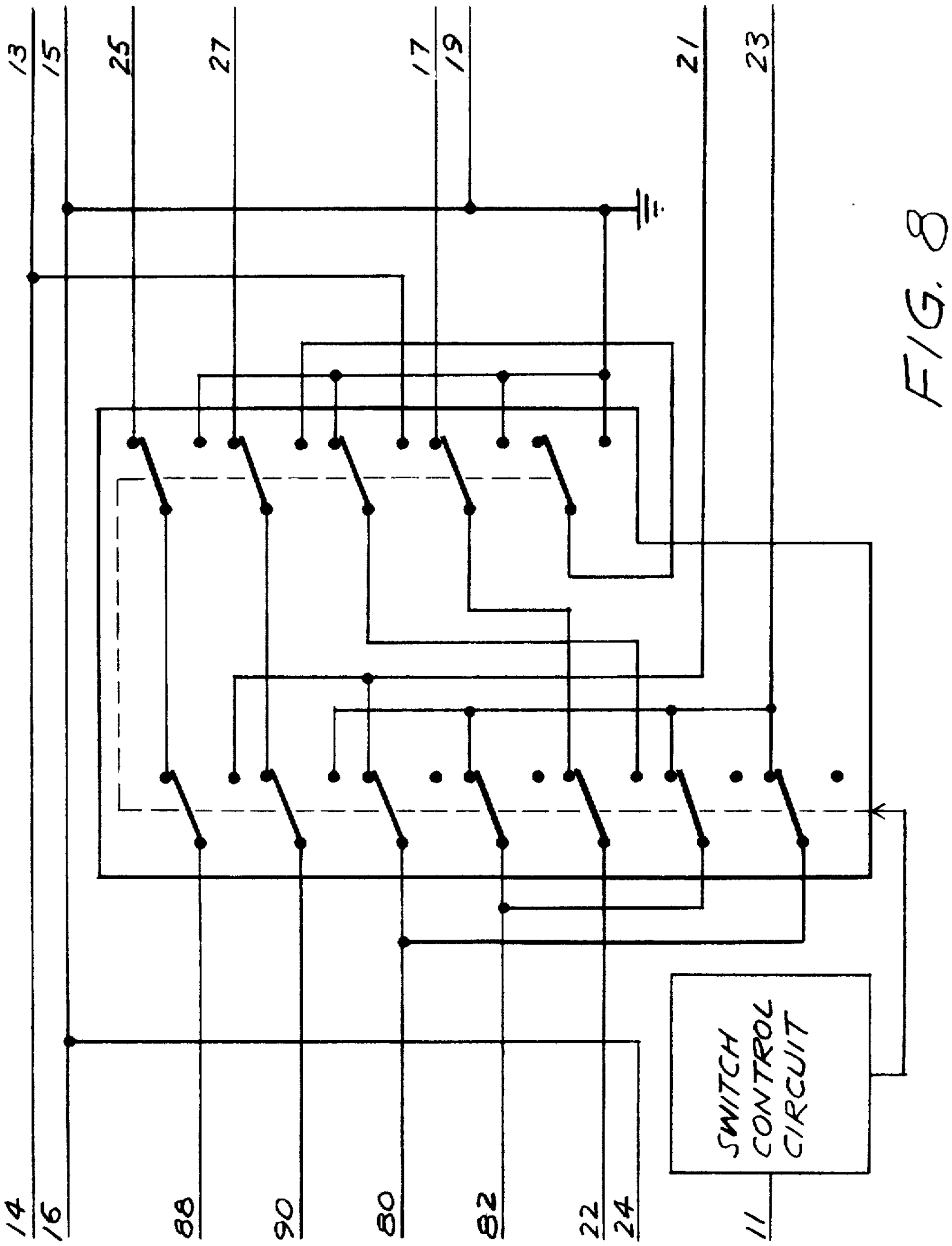
FIG. 8 is a more detailed representation of the Signaling Control Circuits portion of FIG. 2.

Turning now to FIG. 8, therein is disclosed the details of the Signaling Control Circuits 141 of FIG. 2. As mentioned above, both the voice and signaling information are propagated between the first and second Voice and Data Multiplexers 4 and 6 of FIG. 1E via a four-wire transmission line represented in FIG. 1E as the lines 50, 52, 54 and 56. Each of the PBX's 1 and 2 have a pair of wires for accommodating incoming signaling information and another pair of wires for outgoing signaling information. The pair of wires accommodating the PBX outgoing signals are commonly referred to as "M leads" while the pair of wires accommodating incoming signals are referred to as "E leads". In the preferred embodiment of the present invention, the M leads associated with the low order channel are identified as members 13 and 15, while the E leads associated with the low order channel are identified as members 21 and 23. Correspondingly, the M leads for the high order channel are identified as leads 17 and 19 while the E leads are identified as members 25 and 27. From FIGS. 2 and 8 it is apparent that leads 15 and 19 are in fact grounded, and that leads 17 may or may not be grounded depending upon the position of the ganged switches which in turn are controlled by the Switch Control Circuit and the input signal thereto on lead 11.

It should be noted that leads 80, 82, 88 and 90 are the paired outputs of the Receive 1 and Receive 2 portions of the subject system. As such, these leads carry the dial signals, generated in the telephones associated with PBX 2, to the PBX 1 where they are interpreted for selective activation of the telephone associated with the latter PBX.

Proceeding now to an explanation of the operation of the preferred embodiment of the subject invention as set out in FIGS. 1E through 9, it should be understood that when a decision is made to transmit in the full bandwidth mode of operation and a switch is thrown to establish this mode of operation, transmission in one of the other modes of operation is precluded for the balance of that particular communication.

Selection of the full bandwidth mode of operation may be accomplished by one of the plural selection switches on a telephone such as is normally used in conjunction with a priviate branch exchange. Thus, activation of the selection switch will result in the setting of the ganged switches of FIG. 8 to the alternative position to that indicated. As a consequence, dial signals generated by the caller appear on M leads 13 and 15, these are in turn directly connected, by way of Signaling Control Circuits of FIG. 8 to leads 22 and 24 which in turn are inputted into Transmit 2 of FIG. 4. As indicated above with respect to the explanation of the lower portion of FIG. 4, the dial signals are first stabilized in Threshold Circuit 67, whereafter they are modulated by a 2600 Hertz signal in Modulator 69 before being bracketed in the high-order signaling channel via the Band Pass Filter 71. The modulated signaling information is then amplified in member 73 before being transferred from Transmit 2 to the Interface Control Circuits via lead 48. Therein the signals on lead 48 are conducted through the Bandwidth Control Circuit 81 of FIG. 5 to the Linear Combiner 85 and from thence to the Interface 87 for transmission via the lines 54 and 56 of the four-wire transmission system. At the remote location, the dialing information enters Voice and Data Multiplexer 2 via the input leads 50 and 52 as shown with respect to the corresponding leads of Voice and Data Multiplexer 1. As seen in FIG. 9, when the system is operating in the full bandwidth mode of operation, the input signals appearing on input leads 50 and 52 are only connected to leads 66 and 74, which in turn are the input leads to the voice and signaling portion of the Receive 2 section of the Voice and Data Multiplexer. Since the signaling information is being transmitted in the high order signal channel, it appears only to the Full Wave Detector 135 of FIG. 7

The switching circuits of FIGS. 8 and 9 combine to simultaneously disengage the signaling capability of the telephones associated with the high order channel because the latter signaling channel is being used to handle the signaling information corresponding to the full bandwidth communication. Furthermore, the E leads of the low order channel have been disengaged so as to prevent a 1300 Hertz signal in the voice portion of the full bandwidth communication from initiating a ringing of the handsets.

The demodulated signaling information appears at the output of Receive 2 on lines 88 and 90, whereafter it is routed through the equivalent Signaling Control Circuits 141 of Voice and Data Multiplexer 2. As seen in FIG. 8, the signaling inform· ·ion on lines 88 and 90 are, in the full bandwidth mode of operation, connected to lines 21 and 23 which have heretofore been identified as the E leads. In the present example the equivalent of lines 21 and 23 in Voice and Data Multiplexer 2 transfer the signaling information into PBX 2, which signaling information is interpreted in a conventional manner and results in the ringing of the telephone being dialed. Assuming someone is available to answer the telephone, during the ensuing telephone conversation the channel is devoted to full bandwidth operation which cannot be affected by others who might attempt to intervene by signaling on the high-order signaling channel. Such attempts are thwarted by way of the fact that when the system is operative in the full bandwith mode of operation, input signals on M lead 17 is disconnected as is readily apparent from FIG. 8.

Consider now the alternative mode of operation wherein the system is switched to accommodate the transmission of voice frequency signals of abbreviated bandwidth. In this mode of operation the control signals on lead 11 are such that the respective elements of the ganged switch associated with the Switch Control Circuit of FIG. 8 are in the positions shown. Under such circumstances signaling information on the M leads 17 and 19 are transferred through the Signaling Control Circuits 141 and appear at the output thereof on leads 22 and 24, while similar signaling information on M leads 13 and 15 appears at the output of the Signaling Control Circuits 141 on leads 14 and 16. Both sets of signals are modulated respectively in the Transmit 1 and Transmit 2 portions of the subject invention whereafter they appear at the outputs thereof on lines 34 and 48. Hereafter these signals are inputted into the Linear Combiner 85 for transmission to the Receive 1 and Receive 2 portions of the Voice and Data Multiplexer 2. After being inputted into the Receive 1 and Receive 2 portions of Voice and Data Multiplexer 2, the signaling information is demodulated and thereafter routed through the equivalent Signaling Control Circuits 141 of the Voice and Data Multiplexer 2 before being inputted into PBX 2 for interpretation leading to the subsequent actuation of two different telephones, i.e., those being dialed.

The symmetry of design of the switching network comprising the present invention permits callers at either PBX 1 or PBX 2 to initiate the selection of a particular mode of operation when the system is otherwise unused, or otherwise use the communication facilities afforded thereby. The only limitation prescribed by the preferred embodiment of the present invention concerns the ability of a caller at PBX 1 to indicate to the party being dialed what mode of operation he desires to communicate in, i.e., full bandwidth or narrow bandwidth voice or data. In an automatic switching system, this deficiency may be easily rectified by utilizing two different dialing prefixes in association with the number of the party being called such that the PBX will automatically interpret the dialing information and condition the Switch Control Circuits associated with the lead 11 to assume the desired switching state corresponding to the selected mode of operation.

In addition to the operational capability which permits the selection of alternative modes of effecting voice communications in either broad or abbreviated bandwidth, the subject invention also facilitates the transmission of coded information to supplement the voice transmissions or alternatively to partially or completely substitute for the voice communications. In this respect, reference is made to the members 3 and 7 of FIG. 1E which depict narrow band data transmitters and receivers, the former of which is shown as having an output line 29 and an input line 31 connecting it with Voice and Data Multiplexer 1. Units in the nature of transmitter/receiver No. 3 are commercially avialable as self-contained units of pre-designed frequency. The frequency bandwidth per channel is that which allows for transmission of 75 baud. The overall spacing between adjacent channels is 120 Hertz. Referring now to FIGS. 2 and 5, it is noted that the input signals to the Voice and Data Multiplexer from the narrow band data transmitter and Receiver No. 3 are connected directly into the Linear Combiner 85, whereafter they are readied with other signals for transmission via lines 54 and 56. In similar manner the narrow band data input signals from Voice and Data Multiplexer 2 are inputted into the Interface and Control Circuits portion of Voice and Data Multiplexer 1 via lines 50 and 52 where, after being interfaced in member 77 and amplified in member 79, the narrow band data input signals are separated from the other frequency components as they are inputted into the Receive portion of member 3.

A further alternative mode of operation of the subject system allows for the transmission of coded information for either the full bandwidth voice communication or one of abbreviated bandwidth. In the event data is to be transmitted full bandwidth, the information may be inputted into the system via a conventional data set which is a device which may be acoustically coupled to a conventional handset or otherwise patched into the PBX switchboard. As indicated elsewhere in the specification, the mode of operation involving the substitution of data for voice signals in one of the channels of abbreviated bandwidth is effected by substituting a printed circuit board for portions of the Voice and Data Multiplexer.

Figure 10:
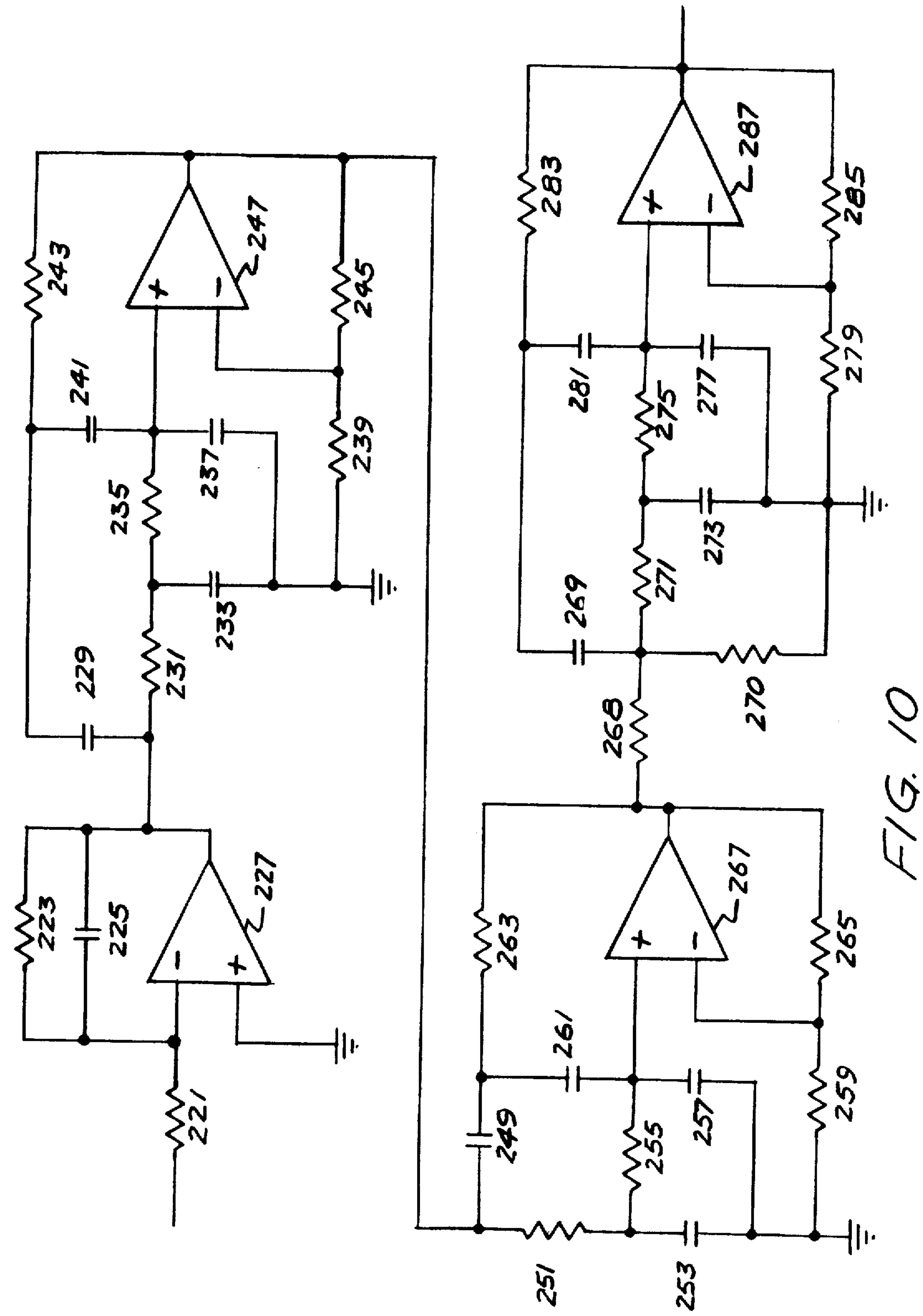
FIG. 10 is a schematic representation of a Low Pass Filter used in the present invention such as Filter 37 of FIG. 3.

Reference is now made to FIGS. 10 through 14 which comprise novel circuit portions of the subject Voice and Data Multiplexers. Turning first to FIG. 10, therein is shown an 1100 Hertz low-pass filter comprising members 37 of FIG. 3, 55 of FIG. 4, 103 of FIG. 6, and 125 of FIG. 7.

As mentioned above, the filters employed in the preferred embodiment of the present invention are of a novel design and play a significant role in making practical the design and operation of the subject invention. More specifically, the filters utilized in the subject invention embody active components in contrast to the prior attempts wherein passive components were employed. The active components produce an effective degree of flatness to the pass band while the use of a feedback loop in conjunction therewith increases selectively while at the same time reducing sensitivity to changes in component values.

Figure 12:
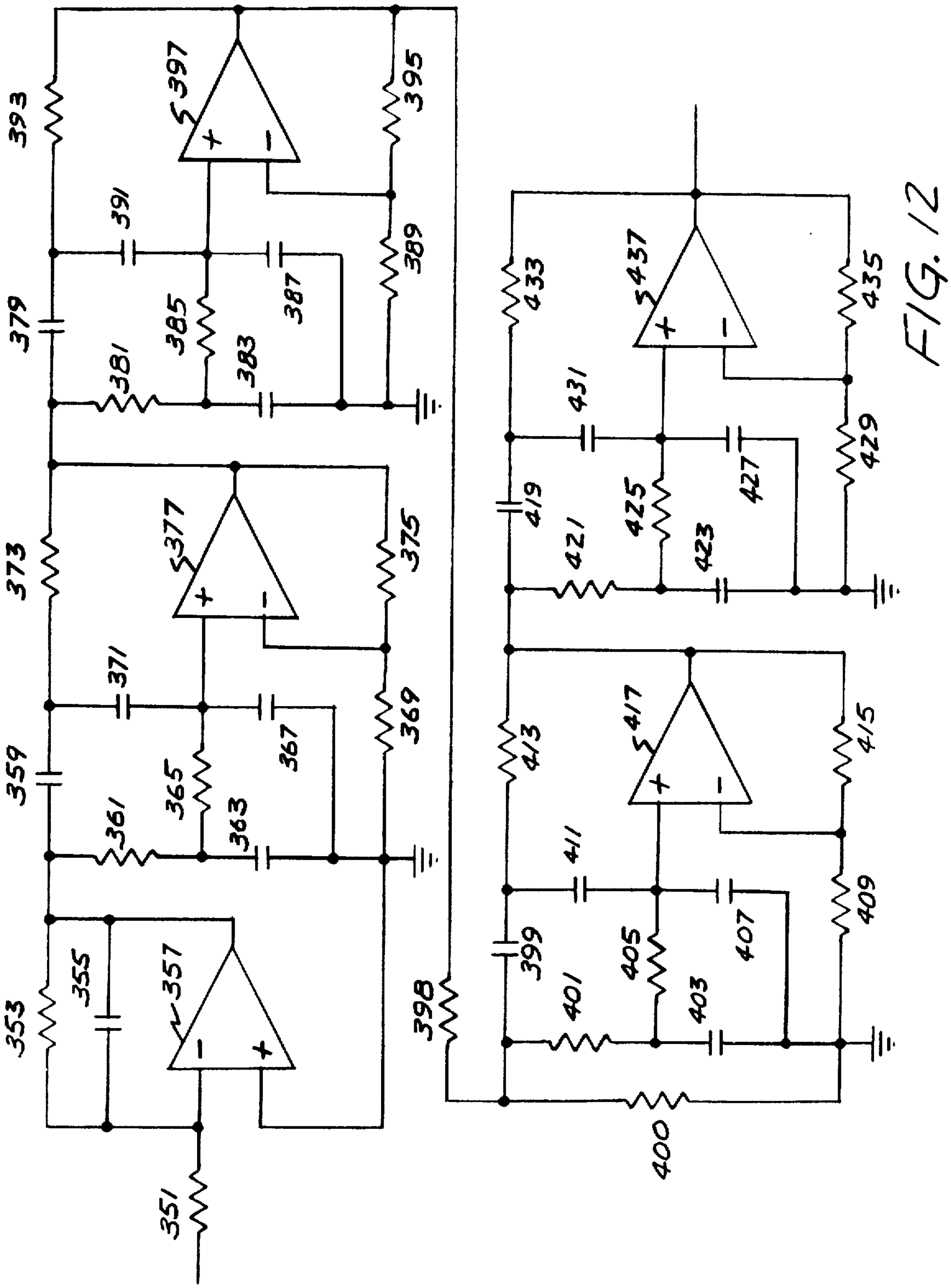
FIG. 12 is a schematic representation of a Low Pass Filter used in the present invention such as filter 59 of FIG. 4.

The filters of FIGS. 10, 12 and 13 all exhibit transfer functions which are characterized by relatively flat pass bands and extremely sharp rolloffs or skirts. These characteristics combine to provide a system capable of transmitting at least two highly intelligible voice grade communications of abbreviated bandwidth information within the effective customer bandwidth of a single telephone channel. The steep rolloff results in a rejection ratio of pass band signals to stop band signals of 1,000 to 1, particularly for the critical filters of FIGS. 10 and 12. The practical effect of the substantial rejection ratio is the effective elimination of crosstalk between the two channels of abbreviated bandwidth.

The filters of FIGS. 10, 12 and 13 all have a commonality of design in that they utilize Cauer polynomials as a basis for their synthesis. More specifically, the Cauer polynomials provide the theoretical basis for the transfer functions used in the design of a special class of filters. Using the Cauer polynomials, or other more common classes of polynomials succh as Bessel, Chebishev or Butterworth, one can factor the theoretical expression comprising the polynomial expression into a plurality of terms which in turn may be synthesized to provide an exact equivalent of the original expression. Each of the terms (factors) in turn constitutes a transfer function and the product of all of these represents the original polynomials. The factors may be synthesized into networks which, when cascaded together, provide a circuit having a response characteristic equivalent to that of the polynomial. The selection of network configurations and components required to synthesize the factors of the polynomial leads to a further mathematical analysis which can be satisfied by various alternative techniques.

The filter of FIG. 10 represents a 7th order Cauer polynomial and as such constitutes five network configurations, or stages, each of which comprises a synthesized factor of the polynomial. In this respect, the first stage comprises the components 221, 223, 225 and 227, the latter of which is an active component which functions as aforeosaid by contributing a controllable degree of gain to the filter. The second state comprises components 229, 231, 233, 235, 237, 239, 241, 243, 245 and 247, all of which function together to synthesize one of the more complex factors of the Cauer polynomial. Stage Three comprises components 249, 251, 253, 255, 257, 259, 261, 263, 265 and 267, which are configured identically to that of Stage Two; however, the circuit component values are changed in order to synthesize yet another complex factor of the Cauer polynomial. Stage Four constitutes a voltage divider comprising Resistors 268 and 270. State Four serves as an additional means of controlling the gain within the filter. Stage Five comprises components 269, 271, 273, 275, 277, 279, 281, 283, 285 and 287, and basically is identical to Stages Two and Three, except that the values of the circuit components are altered in order to synthesize yet another factor of the Cauer polynomial.

Turning now to FIG. 12, therein is disclosed the filter utilized in the implementation of the low pass filters 59 of FIG. 4 and 12 of FIG. 7. The filter of FIG. 12 constitutes the synthesis of a 9th order Cauer polynomial and as such comprises six network stages, the first of which is the same as that of FIG. 10, this being in turn cascaded to four more stages of identical design to corresponding stages of filter 10; however, the latter have different component values both with respect to each other, and with respect to the corresponding stages of FIG. 10. Also included in the filter of FIG. 12 is a Voltage Divider network of similar design and function to that employed in the filter of FIG. 10.

The filter of FIG. 13 constitutes the High Pass Filter 61 of FIG. 4. This filter is of a more simple design than the filters of FIGS. 10 and 12 in that it is a synthesis of a 5th order Cauer polynomial having four sections somewhat similar in design to corresponding sections of the filters of FIGS. 10 and 12.

Reproduced below are the values for the circuit components utilized in the construction of the filters of FIGS. 10, 12 and 13 as embodied in the preferred embodiment of the present invention:

| Figure 10 | | Figure 12 | | Figure 13 | |
|---|---|---|---|---|---|
| Component | Value* | Component | Value* | Component | Value* |
| 221 | 51 | 351 | 27.4 | 451 | 47000 |
| 223 | 37.4 | 353 | 15.4 | 453 | 1.27 |
| 225 | 10000 | 355 | 10000 | 455 | LM307 |
| 227 | LM307 | 357 | LM307 | 457 | 1000 |
| 229 | 1000 | 359 | 1000 | 459 | 137 |
| 231 | 113 | 361 | 59 | 461 | 2000 |
| 233 | 2000 | 363 | 2000 | 463 | 137 |
| 235 | 113 | 365 | 59 | 465 | 10.2 |
| 237 | 1500 | 367 | 1100 | 467 | 1000 |
| 239 | 5.11 | 369 | 4.99 | 469 | 196 |
| 241 | 1000 | 371 | 1000 | 471 | 69 |
| 243 | 56.2 | 373 | 29.4 | 473 | LM307 |
| 245 | 8.25 | 375 | 5.76 | 474 | 1 |
| 247 | LM307 | 377 | LM307 | 475 | 11.3 |
| 249 | 1000 | 379 | 2000 | 476 | .2 |
| 251 | 96.5 | 381 | 27.4 | 477 | 2000 |
| 253 | 2000 | 383 | 2000 | 479 | 100 |
| 255 | 96.5 | 385 | 27.4 | 481 | 4000 |
| 257 | 820 | 387 | 2000 | 483 | 100 |
| 259 | 5.11 | 389 | 10 | 485 | 10 |
| 261 | 1000 | 391 | 2000 | 487 | 2000 |
| 263 | 48.7 | 393 | 13.7 | 489 | 86.6 |
| 265 | 8.25 | 395 | 12 | 491 | 49.9 |
| 267 | LM307 | 397 | LM307 | 493 | LM307 |
| 268 | 1 | 398 | 1 | 495 | 20 |
| 269 | 1000 | 399 | 2000 | | |
| 270 | .1 | 400 | .1 | | |
| 271 | 59 | 401 | 22.9 | | |
| 273 | 2000 | 403 | 2000 | | |

All resistors are in kilo-ohms
All condensers are in Pico-Farads

| Figure 10 | | Figure 12 | |
|---|---|---|---|
| Component | Value* | Component | Value* |
| 275 | 59 | 405 | 22.9 |
| 277 | 2400 | 407 | 2000 |
| 279 | 2 | 409 | 5.76 |
| 281 | 1000 | 411 | 2000 |
| 283 | 29.4 | 413 | 11.5 |
| 285 | 6.65 | 415 | 8.66 |
| 287 | LM307 | 417 | LM307 |
| | | 419 | 2000 |
| | | 421 | 13.7 |
| | | 423 | 2000 |
| | | 425 | 13.7 |
| | | 427 | 2000 |
| | | 429 | .499 |
| | | 431 | 2000 |
| | | 433 | 6.81 |
| | | 435 | 1.65 |
| | | 437 | LM307 |

All resistors are in kilo-ohns
All condensers are in Pico-Farads

Figure 11:
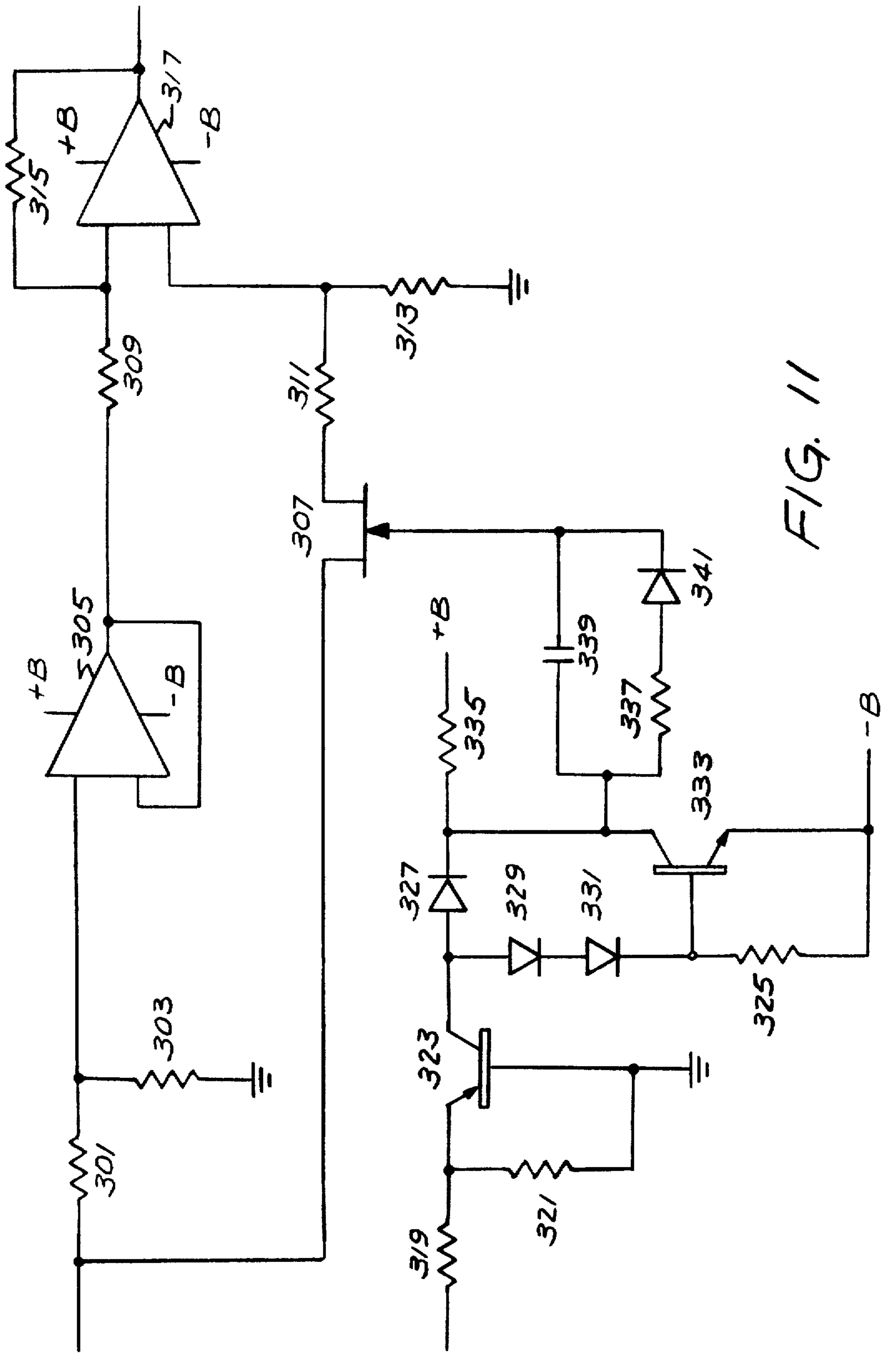
FIG. 11 is a schematic representation of the Modulators 57 of FIG. 4 and 123 of FIG. 7.

Turning now to FIG. 11, therein is disclosed a double side band, suppressed carrier and amplitude modulator. The modulator of FIG. 11 is utilized in modulating the high-order voice frequency signals in member 57 of FIG. 4 and for demodulating these signals in member 123 of FIG. 7. The Modulator of FIG. 11 is of novel design, being comprised essentially of two portions, the upper portion which is directed to the Modulator per se, while the lower portion constitutes a Carrier Voltage Translator which functions to convert a logic level signal to signals of the level required at the input to the modulator portion of the circuit.

Considering first the Carrier Voltage Translator portion of FIG. 11, therein is disclosed an input portion comprising Resistors 319 and 321, and Transistor 323. The input signal to this portion of the Modulator is a carrier signal which in turn is a logic level signal of 0 to 5 volts derived from the Oscillator of FIG. 5 and delivered on line 44 to the subject modulator when the latter serves in the capacity of member 57 of FIG. 4 and to the demodulator 132 of FIG. 7 on line 72.

The output of Transistor 323 is connected through an isolation circuit comprising diodes 327, 328 and 331 to the base of a second transistor 333. The latter is connected between two power supplies which, in the preferred embodiment of the invention, have values of +5 and −15 volts, respectively. Interposed between the output of Transistor 333 and a field effect Transistor 307 of the Modulator portion of the circuit is a shaping and interfacing circuit comprising components 337, 339 and 341.

The operation of the Carrier Voltage Translator is such that as the carrier signal being inputted to Transistor 323 rises from 0 to a +5 volts, conduction is initiated therein which in turn biases Transistor 333 "on" such that the output voltage at the collector thereof rises to the level of the negative power supply, i.e., approximately a −15 volts. This signal in turn reflects itself at the gate of field effect Transistor 307.

In the Modulator portion of FIG. 11, the information signals constituting the high-order voice frequency signals appear at one side of Resistor 301 whereafter passing through a divider network comprising resistors 301 and 303, they are buffered through member 305, input resistor 309 and feedback resistor 315 and are then presented to the negative port of differential amplifier 317. Simultaneously therewith the input signals are presented to one side of the field effect transistor 307. The information signal is gated through the field effect transistor 307 in accordance with carrier signals from the Voltage Translator appearing at the gate of field effect transistor 307. The chopped information signals appearing at the source of field effect transistor 307 are operated upon by the voltage divider comprising resistors 311 and 313 before being presented to the positive port of differential amplifier 317. The output of the field effect transistor 307 when impressed on the positive port of the differential amplifier 317 results in the negation of the original information signal from the frequency spectrum generated at the output of the differential amplifier thus resulting in the double side band suppressed carrier amplitude modulated signals.

The information bearing input signals to the modulator of FIG. 11, constituting the high-order voice communication, appear as the output of low pass filter 55 of FIG. 4 in the transmit portion and on line 70 in the receive portion of FIG. 7. The output of the differential amplifier 317 appears on line 42 of the transmit portion of FIG. 4 and as the input to low pass filter 125 of the receipt portion of FIG. 7.

Typical values for the components of the modulator utilized in the practice of the preferred embodiment of the invention are listed below:

| Figure 11 | |
|---|---|
| Component | Value* |
| 301 | 3.3 |
| 303 | 3.3 |
| 305 | LM307 |
| 307 | 2N4221 |
| 309 | 5.62 |
| 311 | 5.62 |
| 313 | 5.62 |

-Continued

Figure 11

| Component | Value* |
|---|---|
| 315 | 5.62 |
| 317 | LM307 |
| 319 | 4.3 |
| 321 | 6.8 |
| 323 | 2N4126 |
| 325 | 4.3 |
| 327 | 1N914 |
| 329 | 1N914 |
| 331 | 1N914 |
| 333 | 2N4124 |
| 335 | 10 |
| 337 | 510 |
| 339 | 15 |
| 341 | 1N914 |

All resistors are in kilo-ohms
All condensers are in Pico-Farads

Turning now to FIG. 14, therein is disclosed the circuit implementation of the Variable Threshold Device comprising members 115 of FIG. 6, and 137 of FIG. 7. The Variable Threshold Circuits of FIG. 14 functions as a high gain self-comparator to deliver an output signal the amplitude of which is independent of input amplitude and wherein the comparator reference signal is functionally related to the amplitude of the input signal. The role of the variable threshold device in the present invention is to insure faithful reproduction of signaling information being transmitted from one remote telephone switchboard to another. The information signals are subject to degradation of two types; namely, band limiting which reflects itself as a distorted or smeared signal, and amplitude variations which may be in the ratio of 30:1. The simultaneous occurrence of both problems, i.e., smear and signal attenuation, makes it necessary to utilize the amplitude of the incoming signal for reference purposes. In the circuit of FIG. 14, faithful reproduction of the original signal is effected by sampling the input signal and utilizing the amplitude thereof to control the switching of an open loop differential amplifier to thereby faithfully reproduce the input frequency and duty cycle of the original signal as well as to generate a substantially amplified version thereof.

The information signals are AC coupled to Amplifier 513 via Capacitor 501 and resistors 503 and 509. Resistors 505 and 507 function as a voltage divider for selectively biasing the Amplifier 513, thereby effecting a degree of noise immunity to the circuit. The ratio of Resistors 511 to 509 establish the negative gain of the feedback circuit of Amplifier 513. The gain of the feedback amplifier configuration comprising members 509, 511 and 513 is maximized within those limits of the supply voltages which still enable the amplifier to maintain linear operation, thus precluding any clipping of the output signal. The input signal sampled by the AC coupled amplifier appears at the output thereof in inverted and amplified form.

The differential amplifier 515 has connected to the negative input port thereof the information input signal and to the positive input port the output of Amplifier 513. The differential amplifier 515 operates in an open loop condition, i.e., the gain realized is proportional to the difference signal taken across the positive and negative ports and is on the order of 100,000. Any difference between the signals on the positive and negative ports of the differential amplifier 515 is reflected as a signal on the output side which is only limited by the supply voltages, which in the preferred embodiment of the present invention are maintained at approximately plus and minus 15 volts. The signals appearing at the output of the differential amplifier 515 switches polarity each time the original information signal and the inverted amplifier representation thereof cross, thus the reference voltage which the input is compared against is always changing to compensate for changes in input amplitude. The result is a stabilized version of the original signaling information.

Typical values for the components of the Variable Threshold Circuits of FIG. 14 utilized in the practice of the preferred embodiment of the invention are listed below:

Figure 14

| Component | Value* |
|---|---|
| 501 | $50 \times 10^{6}$ |
| 503 | 1.6 |
| 505 | 2.7 |
| 507 | .2 |
| 509 | 3.9 |
| 511 | 27 |
| 513 | LM307 |
| 515 | LM307 |

All resistors are in kilo-ohms
All condensers are in Pico-Farads

The above-outlined operating capabilities which enable the alternative modes of communication, including the ability to transmit two fully intelligible voice communications of abbreviated bandwidth plus the necessary signaling information, all within a conventional telephone channel, comprise a unique system not heretofore available. It should be further appreciated that whereas the preferred embodiment of the present invention has been described in terms of a number of alternative modes of operation, these same design features and operating capabilities may have independent significance. Accordingly, it should be understood that the invention is not limited to the specific combination of alternative modes of operation provided for, but rather, other alternative modes of operation may be accommodated within the present invention so long as the general operating principles are compatible with those set forth in connection with the operation of the apparatus of FIG. 1E.

What is claimed is:

1. A telephone communication system comprising first and second telephone switchboards, means including standard telephone communication facilities interconnecting said first and second telephone switchboards and for temporarily allocating thereto a standard voice grade communication channel having an effective customer bandwidth of approximately 3000 Hertz, which channel may represent a single channel of a multi-channel carrier system, and means including switching means for facilitating the transmission of two separate voice grade communications of abbreviated bandwidth plus dial signals between plural telephones connected to said first and second telephone switchboards, said last-named means including first transmitting means for transmitting a first communication comprising voice grade signals at a first unique band of frequencies within said effective customer bandwidth and for modulating and transmitting at a unique band of frequencies within said effective customer bandwidth a first set of dial signals, both said voice grade signals and said dial signals being generated in a first telephone connected to one of said telephone switchboards, second transmitting means for modulating and transmitting a second communication comprising voice grade signals at a third unique band of frequencies within said effective customer bandwidth and for modulating and transmitting at a fourth unique band of frequencies within said effective customer bandwidth a second set of dial signals, both said second voice grade signals and said second set of dial signals being generated in a second telephone connected to one or another of said telephone switchboards, first receive means for receiving the unique band of voice grade signals transmitted by said first transmitting means, said first means further comprising a demodulator for demodulating the dial signals associated with said voice grade communication transmitted by said first transmitting means and for inputting the demodulated dial signals to the other one of said first and second telephone switchboards, said first receive means further comprising means for interpreting said dial signals and for generating a signal in response thereto to activate the ringer of a third telephone connected to the other one of said telephone switchboards, and second receive means including means for demodulating the said unique band of voice grade frequencies generated in said second transmitting means and the dial signals associated therewith and transferring said demodulated voice and dial signals to the other one of said one or another telephone switchboards for use in activating the ringer of a fourth telephone.

2. A system for use in combination with a common grade telephone voice channel comprising first means operative during a first mode of operation for limiting the physical speech band to a first reduced frequency band of a predetermined bandwidth and for providing said first reduced frequency band to combining means, said bandwidth being less than one-half of the bandwidth of said voice channel and said first band being situated at the low end of said channel, second means operative during said first mode of operation for limiting the physical speech band to a second reduced frequency band of a predetermined bandwidth, for translating said second band to a frequency band above said first band and in said channel and for providing said first reduced frequency band to said combining means, said second band being less than one-half of the bandwidth of said voice channel, said second means being operative during a second mode of operation for limiting the physical speech band to a third reduced frequency band which is slightly narrower than the bandwidth of said voice channel, switching means for disabling said first means during said second mode of operation and means for providing a first signal indicating the use of said first band and for providing a second signal indicating the use of said second or said third band, said combining means being operative for combining said first and second bands and said first and second signals during said first mode of operation and for combining said third band and said second signal during said second mode of operation.

3. The system as specified in claim 2 additionally comprising means for providing at least one data signal to said system for combination with said first and second bands and said first and second signals during said first mode of operation and for combination with said third band and said second signal during said second mode of operation.

4. The system as specified in claim 3 wherein said first signal is disposed within said channel at a frequency which is between said first and said second bands and wherein said second signal is disposed within said channel at a frequency immediately above the upper end of said second and said third bands.

5. The system as specified in claim 4 additionally comprising first and second receiving means, said first receiving means including means for detecting the presence of said first signal and filter means for enabling said first reduced frequency band to pass therethrough and to a telephone during said first mode of operation, said second receiving means including means for detecting the presence of said second signal and translation and filter means for translating said second band to the low end of said channel and for enabling said translated band to pass therethrough and to a telephone during said first mode of operation, said second receiving means detecting the presence of said second signal during said second mode of operation, said first and second receiving means including portions thereof through which said third band passes to a telephone during said second mode of operation.

6. The system as specified in claim 5 wherein said first means comprises input means and a first low-pass filter and wherein said second means comprises input means, a first low-pass filter, a balanced modulator and a second low-pass filter.

7. The system as specified in claim 5 wherein said switching means comprises relay means for connecting the first low-pass filters of said first and second means to said combining means during said first mode of operation and for disconnecting the low-pass filter of said first means from said combining means and connected the input means of said first means and the second low-pass filter of said second means during said second mode of operation.

8. The system as specified in claim 7 wherein said first receiving means comprises a first low-pass filter and output means and wherein said second receiving means comprises a first low-pass filter, a balanced modulator, a second low-pass filter and output means.

9. The system as specified in claim 8 wherein said relay means is operative for connecting said first low-pass filter of said first receiving means to said output means thereof and for connecting said first low-pass filter of said second receiving means to said balanced modulator during the first mode of opertion and for connecting the first low-pass filter of said second receiving circuit to the output means of said first receiving circuit during the second mode of operation.

10. A system for use in combination with a common grade telephone voice channel comprising first means for limiting the physical speech band to a first reduced frequency band of a predetermined bandwidth and for providing said first reduced frequency band to combining means, said bandwidth being less than one-half of the bandwidth of said voice channel and said first band being situated at the low end of said channel, second means for limiting the physical speech band to a second reduced frequency band of a predetermined bandwidth, for translating said second band to a frequency band above said first band and in said channel and for providing said second reduced frequency band to said combining means, said second band being less than one-half of the bandwidth of said voice channel, said first means and said second means including filtering means for shaping the amplitude characteristics of the bandwidths in which said speech bands are limited, the response of said speech band being increased by said filter from the low end of said reduced frequency band to a high response at the upper end of said reduced frequency band, and means for providing a first signal at a frequency within said channel and outside said first and second reduced frequency bands indicating the use of said first band and for providing a second signal at a frequency within said channel and outside said first and second reduced frequency bands indicating the use of said second band, said combining means being operative for combining said first and second bands and said first and second signals.

11. A system for use with a common grade telephone voice channel comprising first means for transmitting a first voice signal, second means for transmitting a second voice signal, third means for transmitting control signals and fourth means for transmitting at least one data signal, said first, second, third and fourth means including means to prevent interference between said voice signals, said control signals and said data signals during simultaneous transmission of all of said signals over a common grade telephone voice channel and said first, second, third and fourth means enabling intellible communications over standard full duplex grade telephone lines.

* * * * *